Figure 7:
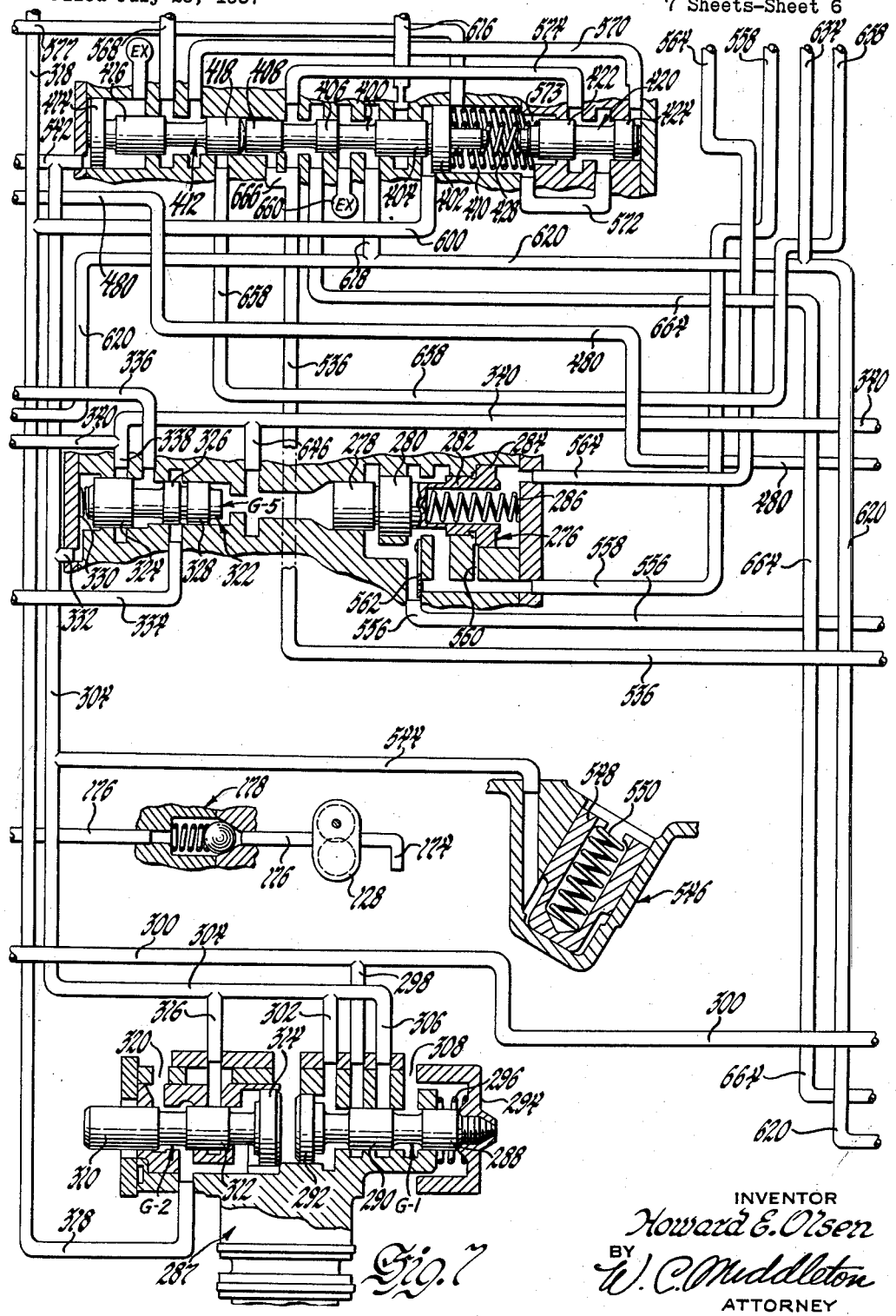

Feb. 12, 1963
H. E. OLSEN
3,077,122
TRANSMISSION
Filed July 29, 1957
7 Sheets-Sheet 1
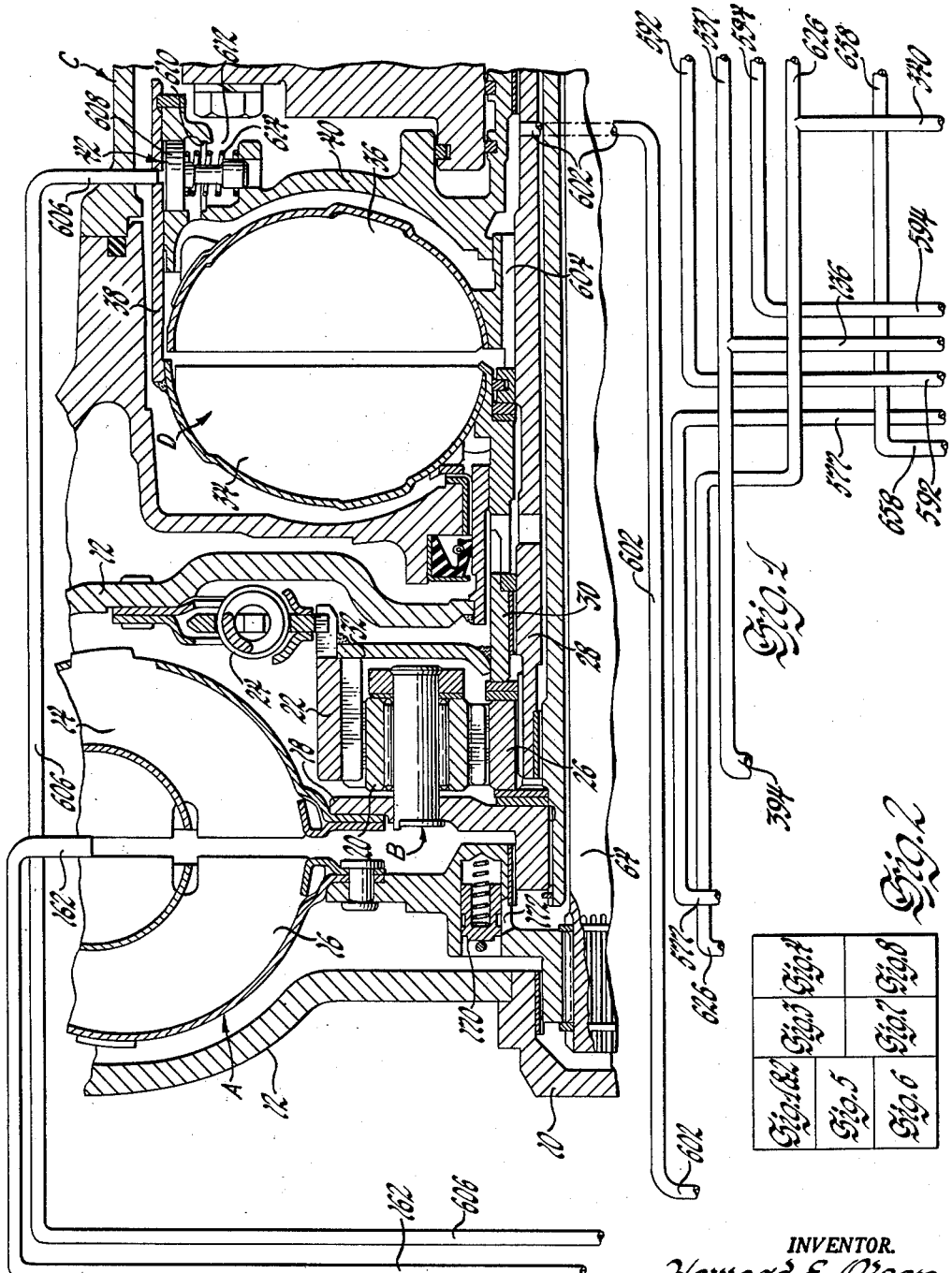
INVENTOR.
Howard E. Olsen
BY
W. C. Middleton
ATTORNEY.

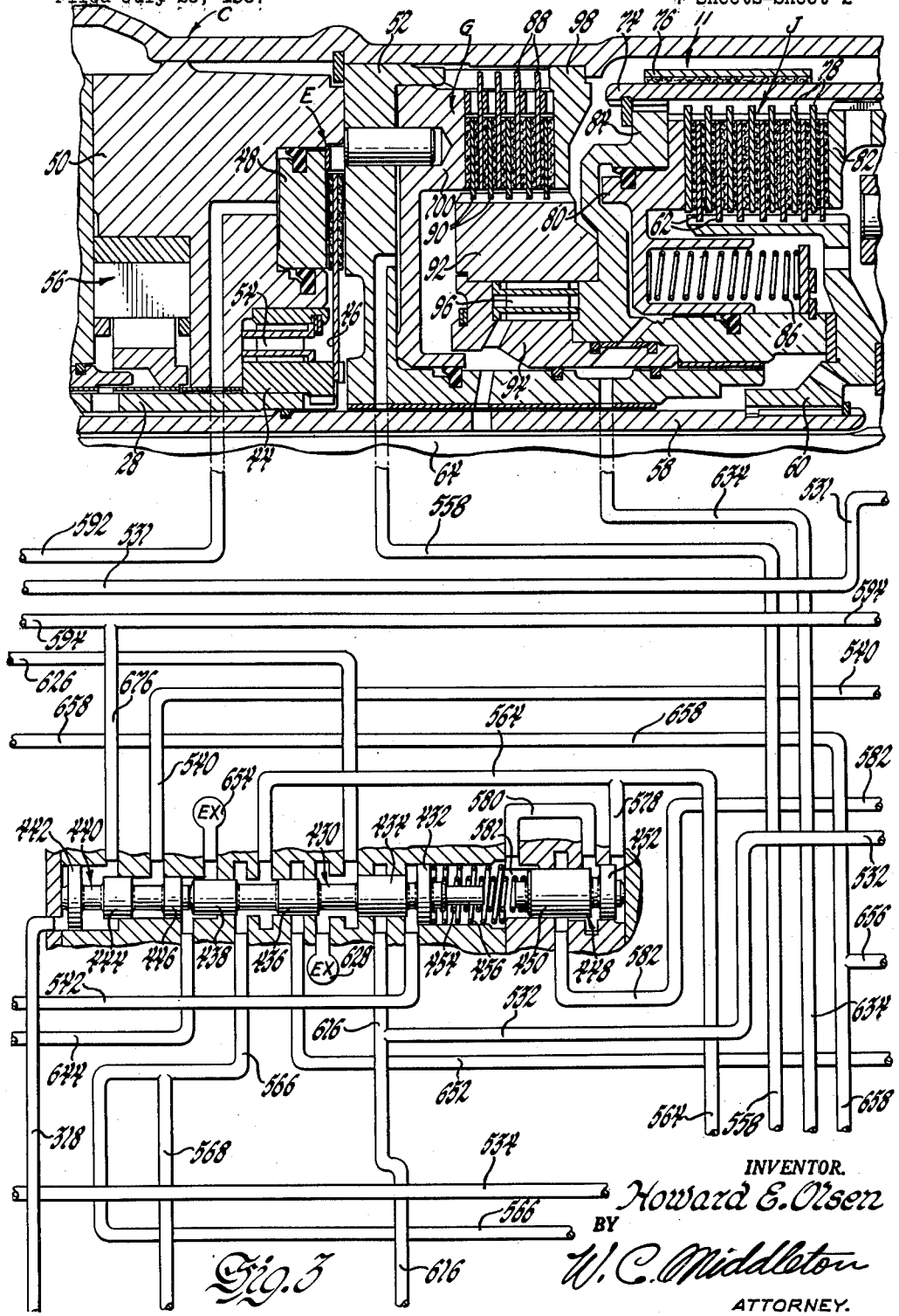

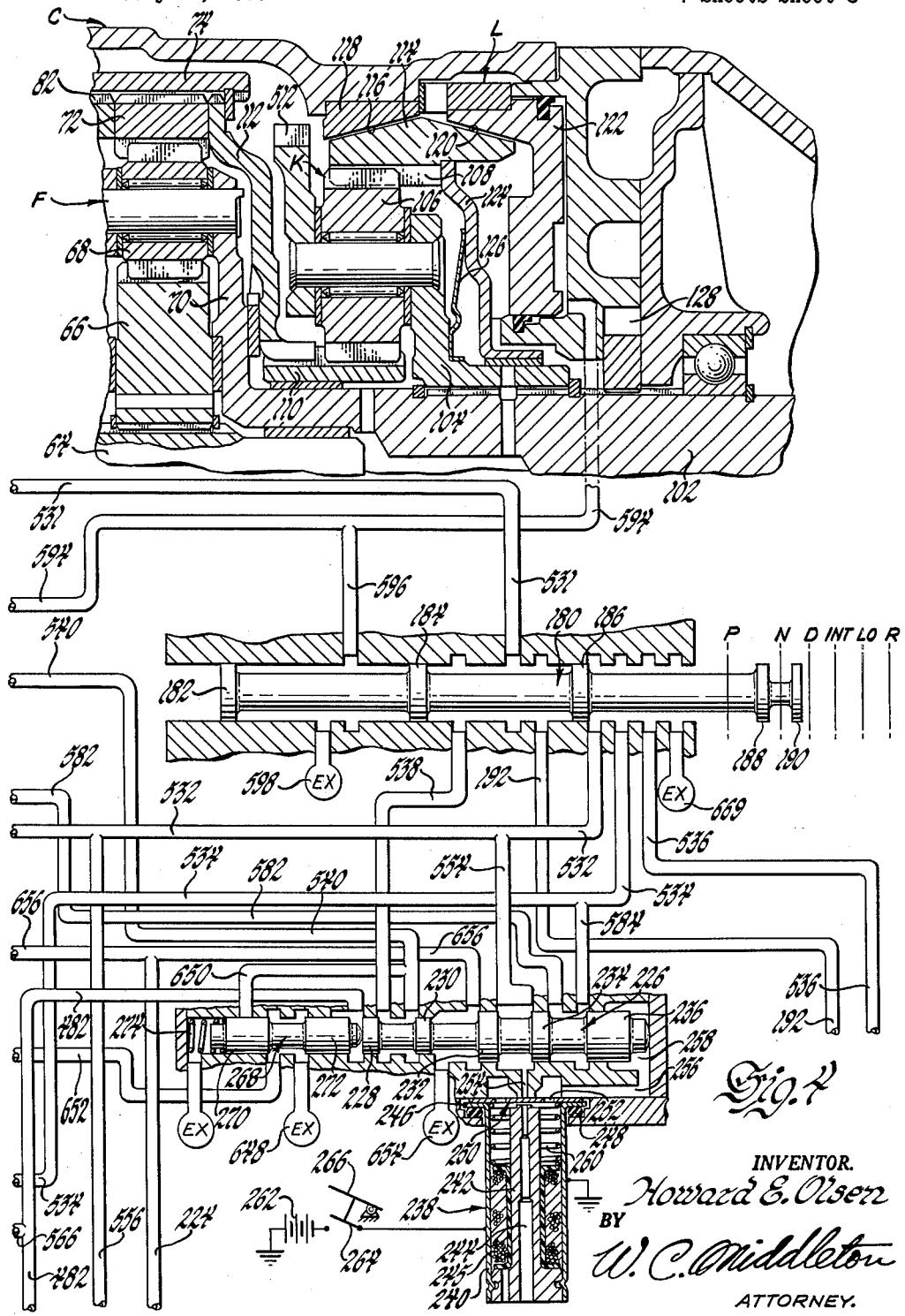

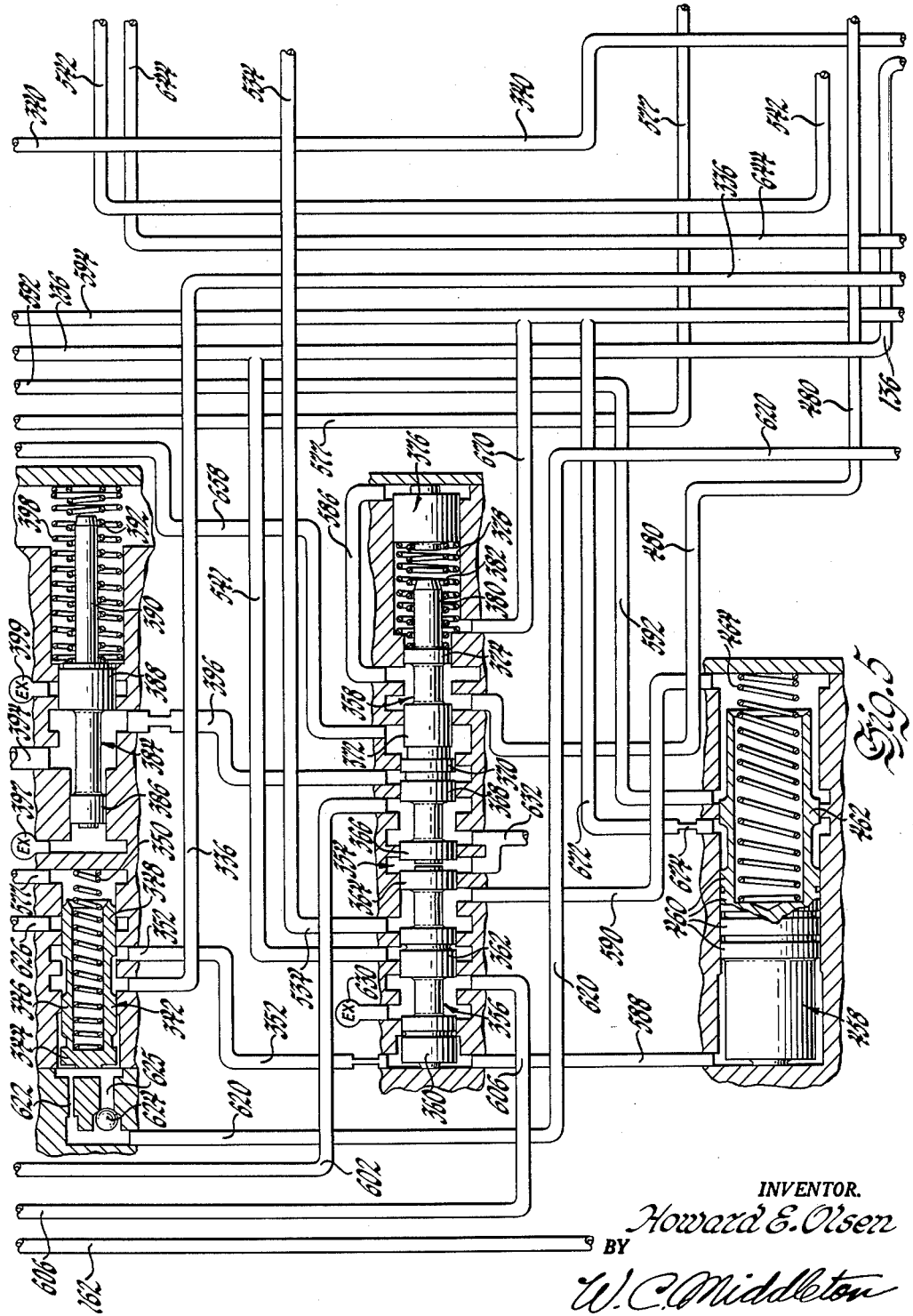

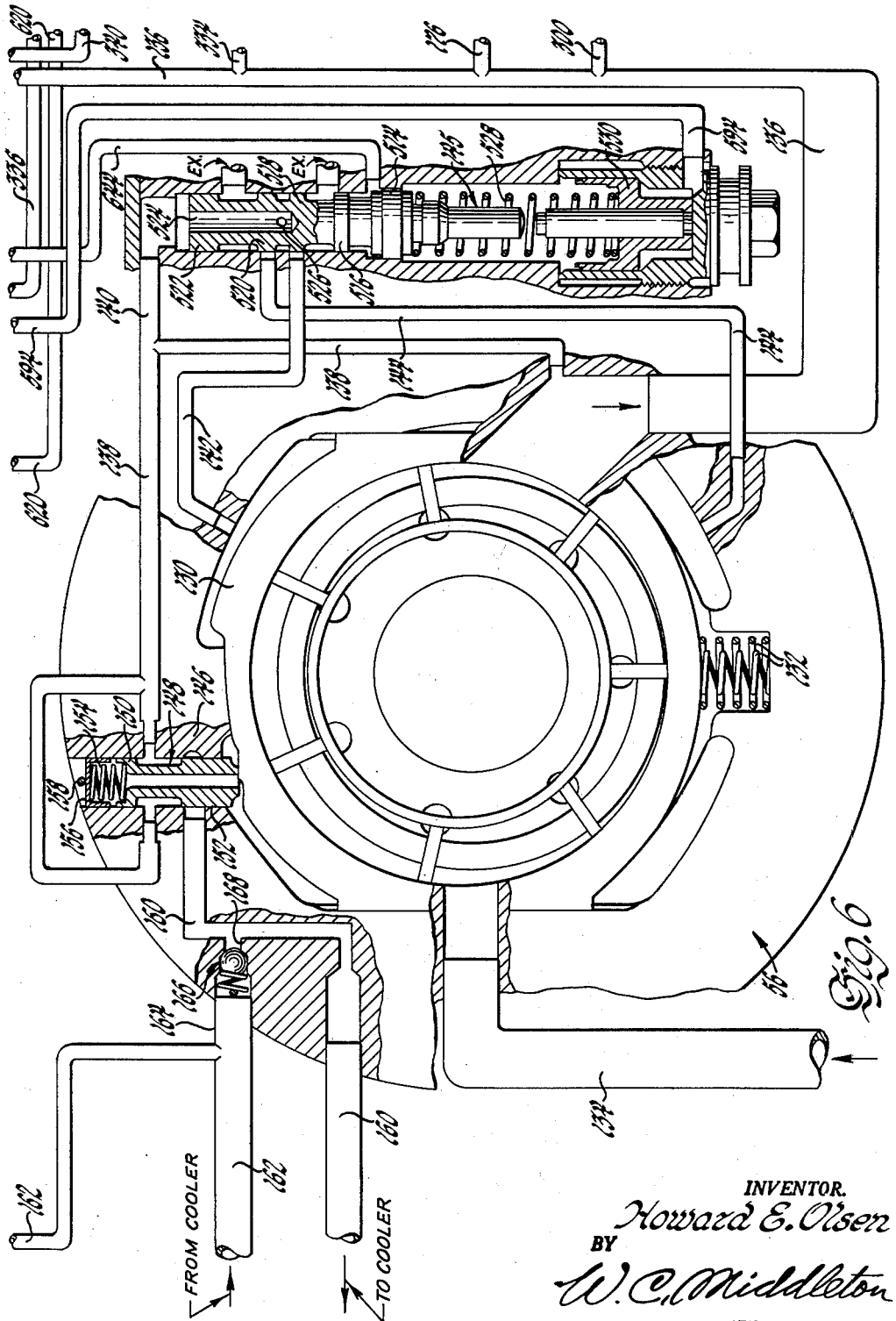

Feb. 12, 1963  H. E. OLSEN  3,077,122
TRANSMISSION
Filed July 29, 1957  7 Sheets-Sheet 6

INVENTOR
Howard E. Olsen
BY
W. C. Middleton
ATTORNEY

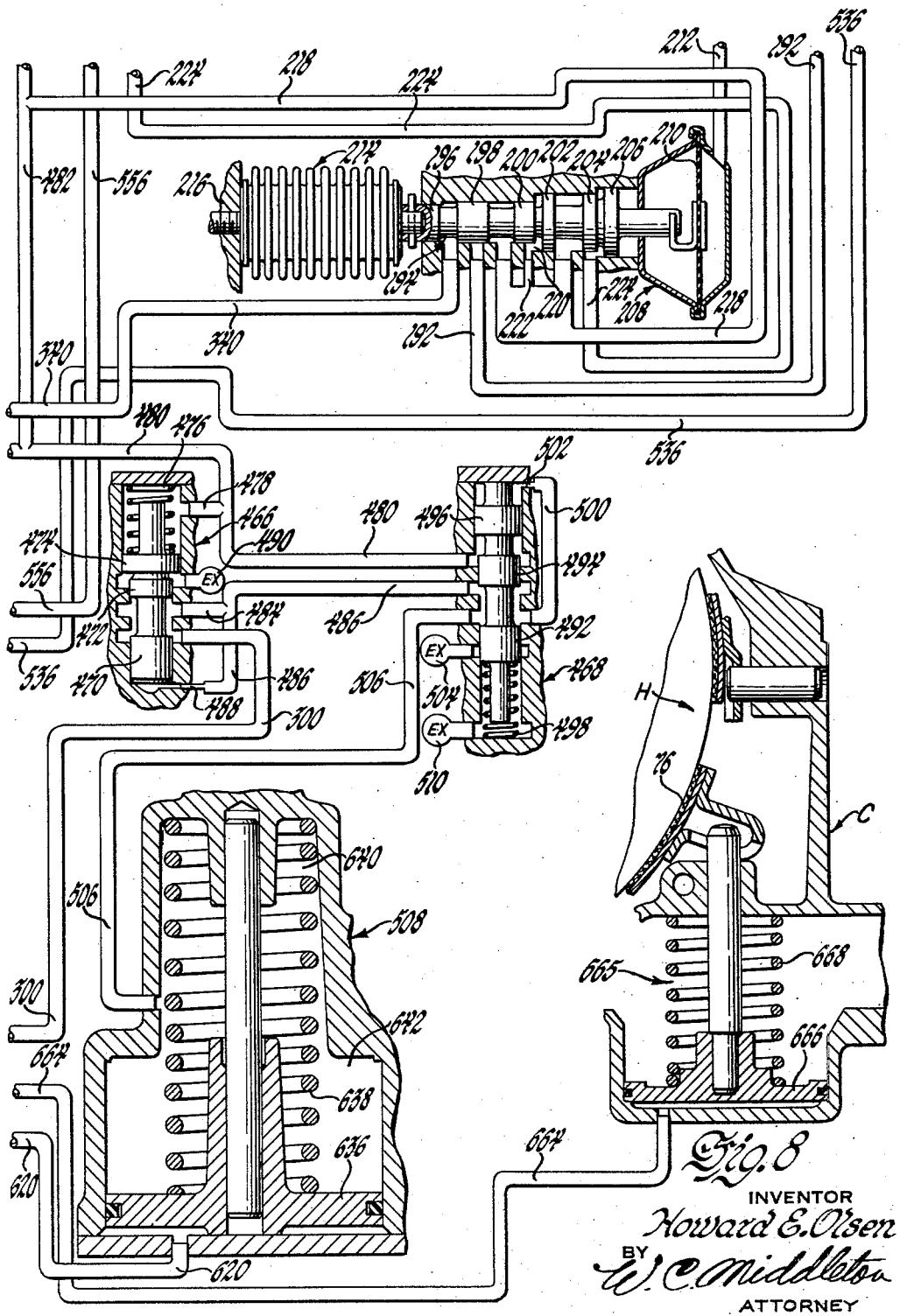

United States Patent Office 3,077,122
Patented Feb. 12, 1963

3,077,122
TRANSMISSION
Howard E. Olsen, Plymouth, Mich., assignor to General Motors Corporation, Detroit, Mich., a corporation of Delaware
Filed July 29, 1957, Ser. No. 674,655
19 Claims. (Cl. 74—472)

This invention relates to transmissions and particularly to improvements in controls for transmissions.

The present invention is an improvement over that disclosed in the copending application Borman et al., S.N. 477,832, filed December 27, 1954, for Controlled Coupling Automatic Transmissions.

In transmissions of the type shown in the Borman et al. application and of the type disclosed herein, planetary gearing is utilized to provide different speed ratios. By holding one element of the gearing against rotation, a reduced speed drive is provided and by locking two of the members of the gearing together, a direct drive through the gearing is furnished. In such transmissions during upshifts, i.e., changes to higher speed ratios as from reduced drive to direct drive, ideally, there should not be any sensation of slipping during a rapid increase in engine speed nor should the changing be so abrupt as to cause an extreme retarding or drag-down of the engine speed. In other words, the change should take place smoothly so that the operator feels a gradual reduction in engine speed without any hint of a distinct ratio change.

To provide smooth ratio changes under all conditions, consideration must be given to the torque characteristics of the engine and any variable that tends to influence these characteristics since, in general, they determine the point where shifts should preferably occur. One such variable is atmospheric pressure for, as is well known, the volumetric efficiency of an internal combustion engine decreases and, consequently, the available engine torque at any given engine r.p.m. with a reduction in the atmospheric pressure. With a decreased engine torque output, shift points should be lowered to take place at the reduced peak torque speeds, or otherwise, the shifts will become rough. This fact is especially applicable when a vehicle climbs to higher altitudes since atmospheric pressure decreases with an increase in the height above sea level.

With the foregoing in mind, the present invention seeks to provide a transmission which shifts automatically and smoothly under all conditions of operation.

Specifically, the invention seeks to provide hydraulically operated controls which are conscious of both changes in atmospheric pressure and changes in the torque output of the engine. These two factors, i.e., atmospheric pressure and torque output, are correlated and then utilized to obtain shift points that are conductive to smooth transitions to higher speed ratios.

In accomplishing the foregoing according to one embodiment of the invention, a control valve is employed which is subjected both to pressure from the engine intake manifold and to variations in atmospheric pressure from a predetermined mean pressure. These two pressures then influence the control valve whereupon a pressure is developed that is reflective of changes in atmospheric pressure and manifold pressure. This controlled pressure acts in opposition to a governor pressure on a shift valve train and together they decide when a change in speed ratio should take place.

It is customary in automatic transmissions to interconnect the throttle with the accelerator pedal and transmission by means of linkage to obtain a "forced downshift." This "forced downshift" aspect provides the vehicle operator with additional acceleration, as when passing another car, simply by depressing the accelerator pedal beyond the normal full throttle position. Subsequent events occur in the transmission that enforce a downshift to a lower speed ratio. The use of linkage comprising several links and levers necessarily results, due to manufacturing tolerances, in variations between different linkages necessitating a separate adjustment of each vehicle. Furthermore, abuse of the linkage by the operator tends to cause misalignment and consequently faulty operation.

To overcome these disadvantages in the use of linkage, the present invention proposes to eliminate the linkage and replace it with a more effective device not requiring frequent adjustments or attention. In particular, the invention contemplates an electrical circuit combined with the accelerator pedal and the hydraulic controls in such a manner that depression of the accelerator pedal beyond the full throttle position will energize an electrical circuit and cause a hydraulic control to be actuated producing the desired downshift. For the electrical circuit the invention proposes an electrical relay having a valve armature that is operated efficiently in a novel manner so that only a relatively small electrical current is required to operate the relay.

The foregoing and other objects and advantages will be apparent from the following description and from the accompanying drawings in which:

FIGURES 1, 3 to 8, inclusive, illustrate parts of the hydraulic circuits employed for the transmission demonstrated;

FIGURE 2 illustrates how these figures can be combined to show the entire system in schematic form.

A transmission embodying the principles of the invention is illustrated by the drawings and includes various working units that have been given the following broad designations to aid in the description. These units are housed within a casing C and include a main coupling A, a front planetary gear unit B, a front unit planetary coupling D, a front unit overrun brake E, a rear planetary gear unit F, a neutral brake or clutch G, an overrun brake H, a rear unit direct drive clutch J, a reverse planetary gear unit K and a reverse unit brake L.

An input 10 for the transmission may be connected to a prime mover such as a vehicle engine (not shown) in the customary way. The input 10 is attached to a cover 12 which encloses a pump 14 and a turbine 16, operating parts for the main coupling A. The pump 14 is connected directly to a front unit planetary carrier 18 that rotatably supports a series of planet pinions 20 for front planetary gear unit B. A ring gear 22 meshes with pinions 20 and is drive connected to the cover 12 through a vibration dampening device 24, the operation of which is well known. Also meshing with the pinions 20 is a reaction sun gear 26 splined on an inner sleeve shaft 28 extending rearwardly thereof.

An outer sleeve shaft 30 has the forward end directly connected to ring gear 22 through a drive flange 32 and the rear end secured to a pump member 34 of the front unit planetary coupling D. Coupling D has a turbine member 36 with a rearwardly extending ring member 38 affixed to a coupling closure member 40. Installed in the coupling closure member 40 are a plurality of coupling exhaust valves 42 to be described later.

The rear end of inner sleeve shaft 28 is connected to an inner race member 44 which, in turn, is connected to a radially outwardly extending clutch plate 46 for the overrun brake E. The overrun brake E, in addition, comprises an overrun brake piston 48, a stationary member 50 for slidably housing piston 48 and a fixed reaction member 52. Both members 50 and 52 are attached to the casing C. One-way brake elements of any well known type, e.g., elements of a roller or sprag brake, are interposed between inner race member 44 and a part of the stationary member 50.

Interposed between overrun brake E and the front unit planetary coupling D is a pressure pump 56, preferably mounted within the stationary member 50. A connection between the pump and a hub part of the closure member 40 provides drive therefor. Details and functions of this pump will be described later.

An intermediate tubular shaft 58 is splined at the front end to the front unit planetary carrier 18 and at the rear end to a rear unit clutch plate carrier 60. A series of clutch plates 62 are supported by external splines on the clutch plate carrier 60.

A central main shaft 64, with the front end connected to turbine 16 and the rear end splined to a sun gear 66, transfers drive from the main coupling A to the rear planetary gear unit F. Planet pinions 68 journaled on a rear unit planetary carrier 70 intermesh with a sun gear 66 and a reaction ring gear 72. Annexed to the ring gear 72 and extending forwardly thereof is a brake drum 74 that provides an outer friction surface for a brake band 76, a component of overrun brake H. Band 76 is actuated into gripping engagement with brake drum 74 by a hydraulically operated servo in the customary way. Brake drum 74 houses a series of clutch plates 78 splined thereto which are interposed between clutch plates 62 on the clutch plate carrier 60. A clutch piston 80, when moved by pressure fluid, compresses the clutch plates 62 and 78 against a reaction or backing member 82 so that a frictional drive through clutch J results. Affixed to the drum 74 and enclosing the piston 80 is a clutch piston housing 84. A plurality of coil springs 86 are grounded to this clutch piston housing 84 and urge the clutch piston 80 out of engagement with the clutch plates 62 and 78 to release clutch J.

The neutral brake G includes a group of stationary brake plates 88 affixed to the casing C and a mating group of brake plates 90 interspaced between brake plates 88. Plates 90 have a splined connection with an outer race member 92 concentric with an inner race member 94. One way brake elements 96, which may be rollers or sprags, are mounted between the race members 92 and 94 to provide a one-way brake when the neutral brake G is engaged compressing mating plates 88 and 90 against a backing plate 98. Brake G is engaged by a hydraulically operated neutral brake piston 100 slidably supported by the fixed reaction member 52.

An output shaft 102 for the transmission may be attached to or as depicted made integral with the planet carrier 70 for the rear planetary gear unit F. The reverse planetary gear unit K is also drive connected to the output shaft 102 through a spline connection with a reverse planetary carrier 104. Carrier 104 rotatably supports a series of planetary pinions 106 intermeshing with a reaction ring gear 108 and a sun gear 110. A drive flange 112 interconnects the rear unit ring gear 72 and the sun gear 110. The ring gear 108 is made a part of a double tapered member 114 which comprises a forward conical surface 116 adjacent a stationary cone member 118 and a rear conical surface next to a mating surface on the reverse unit brake piston 122. The double tapered member 114 is rotatably supported by a disc like element 124. A washer spring 126 interposed between the disc like element 124 and the carrier 104 urges the double tapered member 114 to the released position illustrated. Pressure fluid moves the brake piston 122 forward, initially engaging surface 120, and then forward conical surface 116 with the complementary surface on stationary cone member 118, thus effecting an engagement of the reverse unit brake L and restraint of the ring gear 108 from rotation.

The various units of the transmission just described combine to furnish four forward speed ratios and a reverse, the latter being inoperative during forward drive. For first speed ratio, i.e., maximum torque multiplication, both the front planetary gear unit B and the rear planetary gear unit F are conditioned for operation in reduction drive. In the front unit planetary gear set B, the sun gear 26 is restrained from reverse rotation by the one-way brake elements 54, hence supplying reaction for the front gear unit. The required reaction for the rear planetary gear unit F is acquired by the restraining action of the one-way elements 96 in conjunction with the neutral brake G which combine to prevent reverse rotation of the ring gear 72. Both the front unit planetary coupling D, which is empty, and rear unit direct drive clutch J, which is disengaged, are ineffective in first speed ratio.

The torque drive train with the units prepared for first speed ratio is as follows: Drive to the input 10 is transferred first through the cover 12 to the front unit planetary gear set B. With the sun gear 26 prevented from rotating backwards, input drive to the ring gear 22 from the cover 12 will cause the planetary carrier 18 to advance forwardly at a reduced speed carrying with it the pump 14 of the main coupling A. Since the front unit planetary coupling D has a connection between ring gear 22 and pump member 34, the pump 34 will rotate at the speed of the input 10. However, with the coupling D void of fluid no torque can be transmitted to the turbine member 36. Therefore, the fact that the pump member 34 rotates is of no consequence. The connection between the carrier 18 and the intermediate tubular shaft 58 does not transfer any torque to the rear unit direct drive clutch J since, as mentioned, the clutch J is disengaged. Drive, however, is transmitted by the fluid in the coupling A to the turbine 16 and then to the rear planetary gear unit F by the central main shaft 64. Input torque to the rear unit sun gear 66 is transferred to the rear unit carrier 70, and, accordingly, the output shaft 102 is rotated in a forward direction at a reduced rate inasmuch as ring gear 72 cannot rotate backwards. Because the reverse unit sun gear 110 is restrained from rotation by the connection with the rear unit ring gear 72 and because the reverse unit carrier 104 is splined to the output shaft 102, does not produce any drive since the reverse unit ring gear 108 is free to rotate unimpeded, hence rendering the reverse gear unit K ineffective.

To obtain the second speed ratio, it is necessary to fill the coupling D with fluid. As a result drive of the pump 34 by the front unit ring gear 22 will cause rotation of the turbine 36 and, accordingly, forward rotation of sleeve shaft 28 and the connected front unit sun gear 26. Forward rotation of the sun gear 26 is permitted by the one-way brake elements 54. As the efficiency of the coupling D increases to a predetermined maximum, the ring gear 22 and sun gear 26 will rotate at substantially the same speed, the only difference being that due to the intrinsic slip within the fluid coupling D. Since the slip is slight, for purposes of this description, the front unit planetary gear set B will be considered locked up for direct drive. With the rear planetary gear unit F in reduction, drive will be from the input 10 through the cover 12 and planetary gear unit B, to the pump 14 of the main coupling A, through turbine 16 and main shaft 64 to the rear unit F. The overall reduction ratio in second speed is then determined by the rear unit.

In third speed ratio a double transition takes place since the coupling D is empty and the rear unit direct drive clutch J is engaged. When coupling D empties, the front planetary gear unit B is in reduction as in first speed ratio. Drive then at a reduced rate is transferred by the front unit carrier 18 to the pump 14 of the main coupling A and to the intermediate shaft 58. With the rear unit direct drive clutch J engaged, the intermediate shaft 58 is drive connected to the rear unit ring gear 72 and is driven forwardly, forward rotation of the ring gear 72 being permitted by the one-way brake elements 96. The pump 14 drives the turbine 16 and, accordingly, through the main shaft 64, the rear unit sun gear 66. Both the ring gear 72 and the sun gear 66 of the rear planetary gear unit F will be rotating forwardly at approximately the same speed, namely, the reduced rate of the front planetary gear unit B. The slight difference in speeds between these gears is due to the inherent slip in the coupling A between the pump 14 and turbine 16, previously mentioned relative to the coupling D. The rear planetary gear unit F can be now considered locked up for direct drive whereupon output shaft 102 is driven at a reduced rate corresponding to the reduction ratio of the front planetary gear unit B.

In fourth speed the rear unit direct drive clutch J remains engaged and the coupling D is again filled with fluid to effect a direct drive through both the front and rear gear units in a manner just described.

To acquire a reverse drive through the transmission, the neutral brake G is released freeing the rear unit ring gear 72 from the reverse rotation restraint, the reverse unit brake L is engaged holding reverse unit ring gear 108 against rotational movement, the coupling D is emptied, and the direct drive clutch J is released. With these transmission components having this status, drive will be to the front planetary gear unit B and therefrom at a reduced ratio, since the one-way brake elements 54 will prevent reverse rotation of front unit sun gear 26, through the main coupling A to the rear unit sun gear 66. At this point in the drive train, rotation changes since the output shaft 102 will be stationary for an interval before drive is completed. Consequently, the rear unit carrier 70 becomes a reaction member for the rear unit and the planetary pinions 68 revolve around their separate axes driving the rear unit ring gear 72 backwards relative to the sun gear 66. Reverse rotation of the ring gear 72 is transferred by the drive flange 112 to the reverse unit sun gear 110, and with the reverse unit ring gear 108 held, the reverse unit carrier 104 will be driven in the same reverse direction as the sun gear 110, commencing reverse drive of the output shaft 102. From the foregoing it will be noted the reverse ratio is that afforded by the combination of ratios developed by both the rear unit F and the reverse unit J in conjunction with the front unit B.

The different forward speed ratios through the transmission are obtained by utilizing suitable hydraulically operated mechanisms, in turn, controlled by a hydraulic system. Pressure fluid for the system and these mechanisms is supplied at times by the front pump 56 and at other times by a rear pump 128. The front pump 56, as mentioned before, is driven at engine speed by a hub part of the coupling closure member 40, thus furnishing pressure fluid only when the engine is operating. The rear pump 128, which, as seen in FIGURE 4, is positioned to the rear of and adjacent to the reverse unit brake L, is driven by the output shaft 102 and, hence, can supply pressure fluid only when the output shaft is rotating which, of course, is during movement of the vehicle.

The pressure pump 56 is of the variable capacity type similar to that disclosed in the application of Walter B. Herndon, S.N. 140,176, filed January 24, 1950, now abandoned, entitled "Variable Capacity Pressure System." Inasmuch as this pump does not constitute a part of the present invention, a detailed description is not believed necessary. Briefly, the pump utilizes a slide 130 movable in a guideway within the body of the pump in such a manner that with the related parts the volume of oil discharged or pumped by the pump is varied according to the position of the slide in the body. As viewed in FIGURE 6, coil springs 132 urge the slide 130 to its uppermost position in which the maximum volume of fluid is discharged by the pump. A suction line 134 is in communication with a sump (not shown) so that fluid is drawn by the pump through the suction line 134 and discharged into a main supply line 136. Parallel with the main supply line 136 and in communication with the discharge side of the pump is a line 138 having a branch 140. A top slide supply line 142 and a bottom slide supply line 144 communicate respectively with the top and bottom areas of the slide 130. The operation of these lines in conjunction with a pressure regulator valve shown generally at 145 will be described in detail later.

Parallel line 138 extends to a valve body 146 having slidable in a bore therein a valve member 148 including upper and lower lands 150 and 152. A coil spring 154 is interposed between the valve member 148 and a cup shaped retainer 156 held in position by a cross pin 158 and urges the valve member 148 downwardly from the position depicted. An outlet line 160 connected to a port in the valve body 146 extends to an oil cooler (not shown). Return from the cooler is through a main coupling supply line 162 which communicates with the coupling A, hence supplying cooled liquid for the coupling. A bypass 164 of the supply line 162 includes a ball check valve 166 seated against a reduced portion 168 of the bypass 164.

Discharge from the main coupling A is controlled by a coupling relief valve 170 positioned in the hub of the turbine 16 and calibrated to open a lubrication supply passage 172 upon attainment of a certain pressure within the fluid coupling. When the relief valve 170 opens the supply passage 172, pressure fluid is supplied to lubricating channels arranged throughout the transmission for oiling various parts thereof.

The rear pump 128, which as mentioned before is driven at the speed of the output shaft 102, draws pressure fluid from the sump through a suction line 174 and discharges into a rear pump supply line 176 that communicates with the main supply line 136. A rear pump check valve 178 in the rear pump supply line 176 prevents oil from being discharged through the rear pump from the front pump when the rear pump is idle, e.g., when the vehicle is stationary. At other times the rear pump 128 supplements the front pump in supplying pressure fluid for the system.

*Manual Valve*

From the pumps 56 and 128 pressure fluid is furnished by the main supply line 136 to a port in the valve body for the manual valve shown generally at 180. The valve 180 is slidably received by a bore in the body and includes a series of spaced lands 182, 184 and 186. Sliding movement is transferred to the valve by a fork or suitable agency received between the spaced flange members 188 and 190 at the terminal end of the valve. The valve has several positions denoted by the lines with the legends, which are, reading from left to right, Park, Neutral, Drive (Drive 4), Intermediate (Drive 3), Low and Reverse. As is customary, an operating lever or similar device positioned in proximity of the vehicle steering wheel is employed to position the manual valve 180. The various ports and lines connected thereto will be discussed in detail during description of the operation of the system.

*Control Valve*

A supply line 192 from the manual valve 180 leads to a bore in the valve body which slidably receives the control valve illustrated generally at 194. This valve, which comprises a series of spaced lands 196, 198, 200, 202, 204 and 206, is positioned at the right end a chamber 208 enclosing a movable member as flexible diaphragm 210, which is connected to the end of the control valve 194. The side of the diaphragm 210 connected to the end of the valve 194 is exposed to atmospheric pressure while the opposite side is exposed to pressure from the engine intake manifold (not shown) through conduit 212. The opposite end of the control valve 194 is connected to a closed expansible and contractible chamber as bellows 214. The bellows is evacuated and sealed from the atmosphere and includes in the bellow wrinkles a spring which tends to expand the bellows. An adjustment for the bellows is furnished by an adjusting member 216 which can contract the bellows or permit expansion thereof.

The control valve 194 operates to develop a control pressure which is reflective of the torque load on the engine and changes in atmospheric pressure. It should be kept in mind that the intake manifold supplies a vacuum or negative pressure to the chamber 208 while bellows 214 is influenced by a positive or atmospheric pressure. Hereinafter, the term "manifold pressure" will be used to designate this vacuum or negative pressure. Therefore, reference to maximum or minimum manifold pressures denotes, respectively, maximum and minimum vacuums or negative pressures, i.e., as the manifold pressure becomes more negative it approaches a maximum or as the manifold pressure approaches atmospheric pressure it becomes a minimum. With the engine idling, vacuum developed is a maximum and, consequently, a maximum manifold pressure will act on the diaphragm 210 drawing it along with the control valve 194 to the right as viewed in the drawing. As the torque load on the engine increases this vacuum falls or approaches atmospheric pressure, accordingly, the manifold pressure acting on the diaphragm 210 is less and permits diaphragm 210 to move the control valve 194 leftward as the diaphragm 210 returns to the normal or relaxed position. With these two extremes for the diaphragm 210 in mind, the effect upon the control valve 194 is to produce a minimum control pressure with a maximum manifold pressure, e.g., with engine idling, and a maximum control pressure with a minimum manifold pressure indicative of a full torque load on the engine. Therefore, as manifold pressure decreases, the control valve is urged to the left so that land 198 uncovers the port connected to supply line 192 admitting pressure fluid to the space between the equal diameter lands 198 and 200 and into the control pressure line 218. This control pressure proceeds to a reaction chamber 220 between lands 200 and 202 through a restricted port 222 and also to the space defined by equal diameter lands 202 and 204. Since the land 202 is of greater diameter than the land 200, the valve 194 will be urged to the right whereupon land 204 will uncover a port connected to line 224 to a detent valve shown generally at 226. With the exception of one instance during detent downshifts when the control valve 194 becomes inoperative, as will be explained later, the line 224 serves as a relief or exhaust line for valve 194. As will be noted, the reaction chamber 220 on both sides between lands 198 and 200 and lands 202 and 204 is exposed to fluid at the control pressure developed such that leakage from the control chamber is to a space of identical pressure, a desirable feature since leakage is not a factor tending to reduce this control pressure. In extreme positions, for example when the valve 194 completely covers the line 192 and opens line 224, a zero control pressure results while if the line 224 is closed by movement of the control valve to the left and the line 192 maintained open by the land 198 a maximum control pressure is provided. These maximum and minimum pressures correspond, respectively, to those resulting in maximum and minimum intake manifold pressures as mentioned above.

The bellows 214 compensates for atmospheric pressure changes by varying the control pressure in the following manner. As atmospheric pressure, which acts on the external area of the bellows 214, decreases due to a change in atmospheric conditions or an increase in altitude, the bellows will expand and urge the control valve 194 to the right toward its decreased pressure position. Conversely, upon an increase in the atmospheric pressure, the bellows 214 will be compressed and urge the control valve 194 to the left and its increased pressure position.

Inasmuch as the volumetric efficiency of the engine decreases with a decrease in atmospheric pressure and, consequently, the available engine torque at any given engine r.p.m., a lesser control pressure is desired because of the lower torque output. However, the two decreases are not at the same rate so that the net result from employing the manifold pressure control chamber 208 and the bellows 214 is that the control pressure is a compromise of the two. Since this control pressure is utilized with governor pressures to establish shift points for the transmission, without the compensation for engine torque decreases, shifts would occur at the same point despite a reduction in available torque. As a result, the shifts become rougher than when made as preferred at the peak torque speeds for the engine.

*Detent Valve*

The detent valve 226 is slidably mounted in another bore in the valve body and has a series of spaced lands 228, 230, 232, 234, and 236. The ports and their associated lines will be identified during the operational description. The purpose of the detent valve is to obtain a "forced downshift" in the transmission when the throttle is moved beyond the full throttle position. For downshifting the detent valve 226, an electrical relay 238 is utilized that includes a cylindrical shell or outer housing 240 which encloses a core 242 with a central restricted passage 244 therethrough. An electrical winding 245 is interposed between the core 242 and the housing 240. The upper end of the housing 240 has a sealing flange 246 overlying a resilient sealing member 248 which is supported by a portion of the valve body. Spaced a predetermined distance from the flange 246 is a valve armature 250 having a series of openings 252 therein. The valve armature 250 is positioned to control fluid flow between a reduced passage 254 communicating with the port between lands 232 and 234 and a passage 256 communicating with a control chamber 258. A coil spring 260 urges the valve armature 250 to a position (see FIGURE 4) in which flow between passages 254 and 256 is cut off and the chamber 258 is relieved through restricted passage 244 in the core 242 of relay 238. By the arrangement the resilient sealing member 248 is preloaded slightly by the coil spring 260 since the entire housing 240 including the core 242 and the electrical winding 245 is urged downwardly by the spring.

An electrical circuit including a battery 262 and a switch 264, actuated by an accelerator pedal 266, operates to energize the electrical winding 245 whenever the accelerator pedal 266 is depressed beyond the full throttle position closing switch 264. As a result, a circuit between the battery 262 and the electrical winding 245 is completed and in a manner well known the valve armature 250 is drawn downwardly closing the restricted passage 244 in the core 242 and opening the reduced passage 254. Pressure fluid then proceeds from the passage 254 through openings 252, acts on an area of the winding 245, and urges the housing 240 downwardly in opposition to the resistance furnished by the resilient sealing member 248.

The bodily movement of the housing 240 permits a wider opening of the reduced passage 254 so that an adequate supply of pressure fluid can be transferred through a passage 256 to the control chamber 258 for moving the detent valve 226 to the downshift position. By moving the housing bodily and increasing this opening a smaller air gap between the valve armature 250 and the housing flange 246 is required, hence, higher starting forces are obtained with a lower starting current and, as a consequence, a smaller electrical winding 245 is necessary reducing space requirements as well as cost.

*Downshift Valve*

In an extension of the bore for the detent valve 226, the downshift valve 268 is slidably disposed and includes valve lands 270 and 272. A spring 274 urges this valve to the right into abutting engagement with the detent valve 226. The various ports and connected lines and the relationship of this valve to the detent valve 226 will be covered during the explanation of the operation of the control system.

Neutral Brake Valve

Another bore in the valve body slidably receives a neutral brake valve, indicated generally at 276. The valve includes spaced lands 278, 280, 282, and 284 and is biased to the left by a spring 286. The oil lines and the connected ports in the valve body for this valve will be described during the operational explanation of the system.

Governor

The governor for the transmission is similar in major details to that disclosed by the Patent 2,204,872 to Thompson, issued June 18, 1940, and entitled "Change Speed Gearing and Control." The body 287 of the governor is rotated by the output shaft 102 by structure (not shown) and includes a through bore in which is mounted a pair of metering valves with the general designation G–1 and G–2. These valves develop pressures that rise in response to an increase in the speed of rotation of the governor. The G–1 valve has lands 288, 290 of equal diameter and a larger land 292. A weight 294 is attached to the external end of the G–1 valve and is biased outwardly with the valve by a spring 296. Pressure fluid is supplied to the G–1 valve by a branch line 298 which communicates through a supply line 300 with the main supply line 136 from the pumps. With the governor at rest the spring 296 will bias the G–1 valve outwardly whereupon land 290 will uncover the port connected to line 298 and permit flow of pressure fluid to the port connected to a branch line 302 of a G–1 supply line 304. As this pressure builds up, it will act on the larger diameter land 292 and urge the G–1 valve inwardly so that the land 290 will open a port connected to another branch line 306 of the G–1 supply line 304 to an exhaust port 308. As a result of this metering action, a pressure is developed equal to that necessary to balance the spring 296. When the governor commences to rotate, the weight 294 becomes effective due to centrifugal force and assists the spring 296 so that there is developed a greater pressure.

The G–2 valve which is disposed opposite the G–1 valve and slidable in the same bore has spaced lands 310 and 312 of equal diameter and a larger diameter land 314. Pressure fluid is supplied to the G–2 valve by a branch line 316 of the G–1 supply line 304 which constitutes another difference between the present governor and the governor disclosed by the Thompson patent. In the Thompson patent pressure fluid from the main supply line of the pump is employed by the G–2 valve instead of pressure fluid from the G–1 valve. When the governor rotates above a certain speed the weighted end which includes the land 310 will cause the G–2 valve to be moved outwardly due to centrifugal force until the port connected to the line 316 is opened by the land 312 permitting passage of fluid to a G–2 delivery line 318. The pressure fluid in the line 318 acts on the face of the large diameter land 314 urging the G–2 valve inwardly uncovering the port connected to the line 318 and discharging pressure fluid therein to an exhaust port 320. This metering action which is similar to that of the G–1 valve continues and as the speed of rotation increases the fluid pressure in the line 318 will also increase; however, this increase will be at a slower rate than the pressure developed by the G–1 valve. The pressures developed by the G–1 and G–2 valves will hereafter be referred to as G–1 pressure and G–2 pressure both for identification purposes and for convenience during the description.

G–5 Valve

As viewed in FIGURE 7, the G–5 valve 322 is slidable in an extension of the bore for the neutral brake valve 276. The G–5 valve includes spaced lands 324, 326 and 328 with land 324 being larger than equal diameter lands 326 and 328. A spring 330 biases the valve 322 to the right.

During operation of the G–5 valve, G–1 pressure is supplied by a branch 332 of the G–1 supply line 304. This G–1 pressure will move the valve to the right uncovering a port connected to a branch line 334 of the main supply line 136. Pressure fluid is then transferred between the lands 324 and 326 to a port connected to an outlet line 336. Because of the differential areas between lands 324 and 326, pressure fluid will urge the valve to the left in opposition to the G–1 pressure so that the pressure developed and transferred to the outlet line 336 is proportionately greater than G–1 pressure, for example, approximately five times that of G–1 pressure. In other words, the pressure required to move the valve to the left against governor pressure is five times governor pressure. If the valve 322 moves far enough to the left, land 324 will uncover a port connected to a branch 338 of a line 340 and reduce the pressure. Consequently, the G–5 valve functions as a regulator valve and modulates fluid pressure from the main line so that it becomes less than line but five times greater than the governor pressure. The 5:1 ratio, of course, can be varied by suitable calibration so as to deliver any desired ratio.

Transition Valve

The outlet line 336 from the G–5 valve 322 extends to a port connected to a bore in the valve body in which the transition valve 342 is slidably received. The valve 342 includes spaced lands 344, 346 and 348 and a biasing spring 350 which urges the valve to the left permitting communication between lands 346 and 348 of line 336 with a line 352 to a controlled coupling valve, illustrated generally at 354. The various ports and lines controlled by this valve will be explained later during description of the operation of the system.

Controlled Coupling Valve

The controlled coupling valve 354 comprises two valve elements 356 and 358 slidable in a bore in the body with valve element 356 having spaced lands 360, 362, 364 and valve element 358 having spaced lands 366, 368, 370, 372 and 374. A valve plug 376 is disposed in the bore to the right of the valve element 358 and is urged apart from the valve element 358 by a spring 378 slidable on a stem 380 of valve element 358. Another spring 382 is interposed between the valve body and the plug 376 which also urges the valve plug to the right. The function of the controlled coupling valve is to supply pressure fluid to the front unit coupling D in a manner to be described during description of the sequential operation of the transmission.

Limit Valve

Adjacent the transition valve 342 and slidable in a bore in the valve body is a limit valve, indicated generally at 384 which includes spaced lands 386 and 388. A stem part 390 of this valve supports a biasing spring 392 which urges the valve to the left from the piston depicted. Pressure fluid to the valve is supplied by a branch line 394 of the main supply line 136 and because the land 388 has the larger area, urges the limit valve 384 to the position shown uncovering a port connected to a line 396 to the controlled coupling valve 354 from which it is transferred by the controlled coupling valve to the front unit coupling D. If the pressure should drop during the filling of the coupling, then the limit valve will move to the left cutting off the port connected to the line 396, consequently, insuring that the pressure in the system is not lowered during fill of coupling D to a point that would interfere with proper operation of the transmission. At the left end of the bore, an exhaust port 397 is furnished to carry away any leakage around the land 386.

Another heavier spring 398 resists movement of the valve 384 beyond the position of the valve depicted. As a result, if pressure builds up unduly for any reason, this heavier spring 398 is overcome and the land 388 uncovers an exhaust port 399 to reduce the pressure as a safety measure.

Second to Third Shift Valve

A second to third shift valve train is mounted for sliding movement within a stepped bore in the valve body. The train comprises a shift valve proper, indicated at 400, including a large land 402, intermediate diameter land 404 and two smaller lands 406 and 408 of equal diameters. A spring 410, positioned in the valve bore, urges the shift valve 400 to the left into abutting relation with a governor plug valve 412 that includes a large land 414 and equal diameter lands 416 and 418. On the opposite side of the shift valve 400 from governor plug valve 412, a regulator plug valve 420 is disposed and includes lands 422 and 424. A coil spring 428 is interposed between the shift valve 400 and the regulator plug valve 420 urging these valves apart to the positions demonstrated. A series of ports are provided in the bore for this valve train which will be identified during the operational summary of the system.

Third to Fourth Shift Valve

Within another stepped bore in the valve body is slidably positioned the third to fourth shift valve train comprising a third to fourth shift valve proper, designated generally at 430. Valve 430 has a large land 432, an intermediate diameter land 434 and equal diameter lands 436 and 438. A governor plug valve 440 is located in the stepped bore on the left side of the shift valve 430 and includes a large land 442 and spaced equal diameter lands 444 and 446. On the opposite side of the shift valve 430, a regulator plug valve 448 is slidably mounted and includes lands 450 and 452 of different diameters. A spring 454 urges the shift valve 430 to the left and the position demonstrated in FIGURE 3. Another spring 456 is interposed between the third to fourth shift valve 430 and the regulator plug valve 448 biasing these valves apart. The connection and relation of the ports in the third to fourth shift valve bore will be described and identified later.

Front Unit Brake Valve

A front unit brake valve, indicated generally at 458, is slidably disposed in a bore in the valve body and includes lands 460 and 462. A spring 464 housed within a bore in the valve 458 urges the valve to the left. This valve controls the overrun brake E when certain conditions exist in the transmission as will be described later.

Accumulator Valves

A primary accumulator valve 466 and a secondary accumulator valve 468 are each slidably mounted within bores in the valve body. These valves are supplied by line 300 pressure fluid from the pumps and combine to develop a double regulated pressure.

The accumulator valve 466 includes a small diameter land 470, an intermediate diameter land 472 and a large diameter land 474. A spring 476 urges the primary accumulator valve 466 downwardly to the position depicted. Control pressure, developed by the control valve 194, is supplied to a port in the valve bore of valve 466 by a branch line 478, lines 480, 482 and line 218 from the control valve 194. This control pressure aids the spring 476 to bias valve 466 downwardly.

The primary accumulator valve 466 operates in a conventional manner to meter pressure fluid supplied from the pumps by the line 300 to a port in the valve bore. With the valve in the position shown, pressure fluid from line 300 is transferred between the valve lands 470 and 472 to a branch 484 connected to a transfer line 486 and then through a restriction 488 to the bottom end of the land 470. The valve 466, as pressure builds up, is urged upwardly until the land 472 uncovers an exhaust port 490 and reduces the pressure in the transfer line 486. This metering action continues with the pressure developed being determined by both the spring 476 and the control pressure in the line 480 so that a modulated line pressure or a pressure less than that in the line 300 is supplied by the line 486 to the secondary accumulator valve 468 whereupon the modulated pressure undergoes a further reduction.

The secondary accumulator valve includes spaced lands 492, 494 and a larger land 496. A spring 498 located in the valve bore urges the valve 468 upwardly to the position depicted. In this position pressure fluid in the line 486 is transferred by a port connected thereto between lands 492 and 494 to a port connected to a control line 500 which communicates through a reduced portion 502 with the upper end of the valve 468 and urges the valve downwardly against the bias of the spring 498. Control pressure from the control valve 194 is transferred by line 480 between lands 496 and 494 whereupon, because the land 496 has the larger area, an upward force results. When the pressure in the line 500 is sufficient to overcome control pressure and the bias of spring 498, the valve 468 is moved downwardly until the land 492 uncovers an exhaust port 504 and reduces the pressure in the line 500. Therefore, a pressure less than that in the line 486 is developed by this metering action and transferred by a port connected to a line 506 to an accumulator 508. An exhaust port 510 communicates with the area of the valve bore in which spring 498 is mounted and relieves this area of leakage fluid. The operation of these accumulator valves with relation to the system will be described in detail later.

Park and Neutral

It is preferable that the engine of the vehicle be started only when the manual valve 180 is in either the Park or Neutral position. In the Park position the linkage connected to the manual valve actuates a dog or pawl member (not shown) that engages locking teeth 512 on the carrier 104 of the reverse planetary gear unit K. Since the carrier is splined to the output shaft 102, holding of the carrier 104 by this pawl furnishes a positive lock preventing movement of the vehicle.

When the engine is started, the front pump 56 is driven and commences to draw oil from the sump through the suction line 134 and discharge into the line 136. The pressure developed by the pump is determined by the pressure regulator valve 145 which is slidable in a bore in the valve body and which includes a large diameter land 514 and a series of spaced equal diameter lands 516, 518, 520 and 522. The upper end of the regulator valve 145 has an internal open bore and communicates with the cross orifice 526 in the valve between lands 518 and 520. A control spring 528 is interposed between the valve land 514 and a plug 530 in the bottom end of the valve bore. The tension of the spring 528 is selected to develop a pressure of some predetermined value, e.g., 95 p.s.i. Simultaneously with the supply of pressure fluid to the line 136 pressure fluid is transferred by lines 138 and 140 to the upper end of the regulator valve. If the pressure of the fluid is below a certain value, then the spring 528 will maintain the regulator valve in a position placing the cross orifice 526 in communication with the line 144 which supplies pressure fluid to the bottom of the slide 130 urging it upwardly to the maximum delivery position. After the pressure attains a certain value the regulator valve 145 will be moved downwardly until the cross orifice 526 communicates with a port connected to the line 142 to the top of the slide 130. This pressure fluid will urge the slide downwardly against the spring 132, hence reducing the volume of the pump output. During operation, the regulator valve will continuously move between these positions in which communication is established between the cross orifice 526 and the lines 142 and 144 so that the volume of oil supplied by the pump is sufficient to create the desired output pressure.

When the slide 130 is moved downwardly a predetermined distance, after the desired output pressure is attained, the valve member 148 is then moved downwardly by the spring 154 establishing communication between the line 138 and the line 160 to the cooler. From the cooler, as mentioned before, pressure fluid is transferred by the line 162 to the main coupling A.

When the main coupling A has been filled and the pressure therein exceeds a value at which the relief valve 170 in the hub of the turbine 16 opens, then, as has been described, pressure fluid is transferred from the coupling through the passage 172 and distributed by the lubrication channels in the transmission. If an obstruction should occur in the cooler, the check valve 166 will be unseated and pressure fluid will be supplied directly to line 162 and the main coupling A through the bypass 164 insuring a constant supply of pressure fluid to the coupling.

With the manual valve in either the Park or Neutral position, pressure fluid from pump supply line 136 is supplied via a branch 531 thereof to a port in the bore between valve lands 184 and 186. Land 186 is located to the left of lines 532, 534 and 536 and opens these lines to exhaust at the open end of the valve bore as shown. To the left of the land 186 a port, which is connected to a line 538 that extends to a port in the bore of the detent valve 226 between lands 228 and 230, is maintained in communication with the port connected to line 531. From the area between these lands 228 and 230, pressure fluid is transferred by a line 540 to the third to fourth shift valve train 430 between the lands 444 and 446 of the governor plug valve 440, at which point further progress of the fluid is halted.

From the main supply line 136, pressure fluid is also supplied by line 300 to the governor by way of branch 298 where an initial G-1 pressure is developed of approximately 5 p.s.i. due to the spring 296 acting to urge the weight 294 outwardly as previously explained. This relatively low G-1 pressure is then delivered to the line 304 to the G-5 valve 332. The branch 332 of the line 304 supplies this G-1 pressure to the left of land 324 and as described before modulates pressure fluid from branch 334 of the main supply line 136 and discharges it into line 336 which communicates with the transition valve 342. In the illustrated position of valve 342, passage of pressure fluid is permitted between the lands 346 and 348 whereupon G-5 pressure is transferred by line 352 to the end area of the controlled coupling valve 354. Because the value of the G-5 pressure is so low, it is incapable of moving the controlled coupling valve 354 from the position shown and supply of pressure fluid from a branch 541 of the main supply line 136 is prevented from further progress by the land 362.

Another branch 542 of the G-1 supply line 304 transfers G-1 pressure to the left end of the land 414 of the second to third governor plug valve 412 and also line 542 communicates with the third to fourth shift valve 430 between lands 434 and 432.

Still another branch line 544 of the G-1 supply line 304 extends to a reverse blocker, indicated generally at 546, which comprises a piston 548 and a biasing spring 550 that urges the piston 548 to the position demonstrated. The function of the reverse blocker is, upon attainment of a predetermined value of G-1 pressure, to inhibit or prevent movement by suitable mechanism (not shown) of the manual valve 180 to the reverse position. With the vehicle idle, this G-1 pressure is not sufficient to prevent movement of the manual valve to reverse. However, after the vehicle attains a speed, e.g., 7-8 m.p.h. the reverse blocker 546 becomes operative and prevents movement of the manual valve 180 to the reverse position.

As viewed in FIGURE 4 with the manual valve 180 in the neutral position, communication is established between the lines 531 and 192, the latter of which extends to the control valve 194. At this point because pressure in the intake manifold is at a maximum (engine idling) the control valve 194 is moved to the right so that land 198 covers the port connected to the line 192. Further progress of the pressure fluid in this line 192 is halted and the control pressure becomes zero. It should be noted that when the manual valve is in the Park position the port connected to the line 192 is cut off from communication with the line 531.

From the foregoing it will be noted that in either Park or Neutral positions of the manual valve 180 and with the engine idling the only hydraulic action taking place in the system is that of supplying oil to the main coupling A and to the governor for developing a G-1 pressure that, in turn, is multiplied by the G-5 valve 330 to develop a G-5 pressure. This G-5 pressure is transferred to the control coupling valve 354 by the transition valve 342 but is too low to move the control coupling valve, as mentioned before, hence ceasing hydraulic action from beyond the control coupling valve. All of the remaining lines of the hydraulic system during this phase of the operation leading to the front unit planetary coupling D, the controlled coupling exhaust valves 42, the front unit overrun brake E, the neutral brake G, the rear unit direct drive clutch J, the overrun brake H and the reverse unit brake L are all connected to exhaust. The exact exhaust connection for each unit will be further described during the description of the sequential operation of the transmission.

When it is desired to move the vehicle forward, the manual valve is positioned in Drive or the Drive Range 4 position, Intermediate or Drive Range 3 position or Low position. The operation of the controls will be described in this sequence.

*Drive Range 4*

When the manual valve 180 is moved to the right to the Drive Range 4 position, land 186 uncovers the port connected to line 532 whereupon pressure fluid from the pump is conducted by lines 136 and 531 through the valve bore to this line 532. A branch 554 of the line 532 extends to a port in the bore for the detent valve 226 where the pressure fluid is prevented from further movement in the system by the lands 232 and 234. Another branch 556 of the line 532 extends to the neutral brake valve 276 and acts on the left side of land 280 urging the valve to the right against the opposing force of the spring 286.

When the neutral brake valve 276 moves to the right, land 280 impedes communication between line 556 and a line 558 that extends to the piston 100 of the neutral brake G. This pressure fluid acts on the piston 100 and slowly engages the clutch plates 88 and 90 which prevent the outer race 92 for the one way brake elements 96 from rotation in either direction. Pressure fluid in the line 558 also communicates through a reduced passage 560 with the left side of the land 284 providing an additional force tending to urge the valve to the right. A spring member 562 provides a one way bypass around the valve 276 when the neutral brake G is exhausted to insure a rapid disengagement.

As soon as the control valve 194 develops a control pressure, as when the accelerator pedal is depressed reducing intake manifold pressure, this control pressure is supplied to the right end of valve 276 by a line 564 which communicates through the third to fourth shift valve 430, when in the downshift position depicted, with a line 566, in turn, connected to lines 482 and 218 to the control valve 194. With this arrangement, if the intake manifold pressure is reduced, as with a heavy load on the engine or with the accelerator partially or fully depressed, the control pressure developed is sufficient to maintain neutral brake valve 276 in its left hand position so that pressure fluid is supplied rapidly to the line 558 to produce a quick engagement of the neutral brake G. On the other hand, if the control pressure is slight, as with the engine speed near idle with a small load, supply of pressure fluid to line 558 takes place slowly around land 280 to obtain a gradual engagement of the neutral brake G.

Timing the engagement of the neutral brake G is important, since with the engine idling and the main coupling A filled with fluid, the rear unit sun gear 66 will be driven by the turbine 16 of the coupling A and cause the ring gear 72 to rotate in a reverse direction due to the reaction provided by the carrier 70. Carrier 70 is connected to the output shaft 102 which is maintained stationary. This reverse rotation of the ring gear 72 will cause the same rotation to be transferred by the one-way brake elements 96 to the outer race member 92 and, consequently, plates 90 will be also rotating in the reverse direction. The timing action of the neutral brake valve 276 causes a smooth gradual engagement of these reversely rotating clutch plates 90 with the stationary plates 88.

With the engine idling the load on the output shaft 102 is sufficient to overcome any torque transmitted by the main coupling A and the slip of the coupling is sufficient to prevent creep of the vehicle.

*First Speed Ratio*

When the neutral brake G has been applied, the transmission, as mentioned before, is conditioned for drive in the first speed ratio, i.e., with both the front unit B and the rear unit F conditioned for reduction drive. Transmission of torque in first speed is from the input 10 through the cover 12, the vibration dampening device 24 to the ring gear 22 for the front planetary gear unit B. With the sun gear 26 prevented from reverse rotation by the one way brake elements 54, drive in a forward direction at a reduced rate is transferred by the carrier 18 to the pump 14 of the coupling A and then from the turbine 16 to the main shaft 64. From the main shaft 64, drive is transferred to the sun gear 66 for the rear unit F. Since the ring gear 72 is restrained against reverse rotation by the one way brake elements 96, reaction is afforded that causes carrier 70 and, as a result, the output shaft 102 to be rotated forwardly at a reduced speed.

As mentioned before, the intake manifold pressure for the engine varies with the load on the engine and throttle position. So that as the throttle is opened to start acceleration of the vehicle, a control pressure is developed by the control valve 194 which is reflective of manifold pressure acting on the chamber 208 and atmospheric pressure acting on the bellows 214. This control pressure then proceeds through lines 218, 482, 566 and a branch 568 thereof to a port connected to the bore of the second to third shift valve 400. With this valve 400 in the downshift position demonstrated, control pressure is transferred between lands 416 and 418 of the governor plug valve 412 to a line 570 which communicates with the right end of the land 424 of the regulator plug valve 420. As this control pressure increases, it will move the regulator plug valve 420 to the left whereupon land 424 will uncover a line 572 and transfer pressure fluid to a spring chamber 573 adjacent the left side of land 422 of the plug valve 420. This pressure then will move the plug valve 420 to the right interrupting communication between the lines 570 and 572 and opening communication between the line 572 and a line 574 that can be traced between lands 406 and 408 of the second to third shift valve to line 536 which extends to the bore of the manual valve 180 and then exhausts through the open end of the bore. As a result, the regulator plug valve 420 modulates the control pressure by this reciprocating movement and the modulated pressure tends to maintain the second to third shift valve in the down shift position shown. A line 577, extending from the spring chamber 573 to the transition valve 342, supplies this modulated pressure to land 348 augmenting the biasing force of spring 350 during third to second downshift, later explained.

The line 566 also conducts control pressure from the control valve 194 to a port in the bore for the third to fourth shift valve 430 where this control pressure is transferred between the valve lands 436 and 438 to a port connected to the line 564 and then through a branch 578 thereof to the right side of the land 452 of the regulator plug valve 448. This control pressure will move the regulator plug valve 448 to the left until the land 452 uncovers a line 580 that communicates with a spring chamber 581 between the valves 430 and 448. Pressure fluid then will act on the end area of the land 450 and urge the valve 448 to the right interrupting communication between the lines 578 and 580 while permitting communication between the lines 580 and 582. Line 582 is connected to a port in the bore of the detent valve 226 which in turn is connected between the lands 234 and 236 with a port connected to a branch line 584 of the line 534. Since line 534 is open to exhaust, the regulator plug valve 448 will modulate the control pressure in the same manner as the second to third shift valve regulator plug valve 420. This modulated pressure as with the second to third shift valve 400 urges the third to fourth shift valve 430 towards the downshift position shown.

Control pressure from the control valve 194 is also transferred by line 480 to a port in the bore of the control coupling valve 354 where it proceeds between lands 372 and 374 of the valve 354 to a line 586 which communicates with the right end area of the plug 376 urging both the plug 376 and the control coupling valve 354 to the left.

The front unit brake valve 458 is controlled by G–5 pressure acting on the left end which is transferred from the controlled coupling valve 354 by a line 588. A line 590 is connected to the right end of this brake valve 458 and communicates through the bore of the control coupling valve 354 between lands 362 and 364 with the line 534 which is open to exhaust through the bore of the manual valve 180. With the brake valve 458 in the position illustrated the land 462 permits communication between the line 590 and a line 592 which communicates with the piston 48 for the front unit overrun brake E. With the line 590 connected to exhaust this front unit overrun brake E will be disengaged. The valve 458 has other functions that will be apparent from the explanation of Intermediate or Drive 3 Range and Reverse operations.

Also, the reverse brake L is disengaged since a supply line 594 therefor is connected by a branch 596 through the manual valve bore to an exhaust passage 598.

As the vehicle accelerates, the governor will be driven by the output shaft 102 and develop a higher G–1 pressure which is then metered by the G–2 valve, as previously explained, to furnish a G–2 pressure in the line 318. Line 318, through a branch 600, communicates with the left end of the land 402 of the second to third shift valve 400 and, because the area of the land 402 is greater than that of the land 404, this G–2 pressure will urge the second to third shift valve towards the upshift position. The G–2 supply line 318, in addition, communicates with the left end of the land 442 of the governor plug valve 440 for the third to fourth shift valve 430 similarly urging this valve train toward the upshift position.

When the output shaft 102 starts rotating the rear pump 128 commences to draw oil from the suction line 174 and discharge it into the line 176. As this pressure increases to a point sufficient to overcome the pressure of fluid from the front pump the check valve 178 will open and the rear pump will supply pressure fluid to the main supply line 136.

Until a predetermined vehicle speed is attained, e.g., 7–8 m.p.h. the transmission will continue to operate in the first speed ratio.

*Shift First to Second*

With the vehicle progressing forwardly, the output shaft 102 will attain a speed such that G–1 pressure acting on the G–5 valve 322 will cause the valve to develop a high enough pressure in the lines 336 and 352 to overcome the spring 382 and control pressure acting on the plug 376. Hence, the controlled coupling valve 354 will move to the right a distance permitted by the stem 380. As aforedescribed, the control pressure supplied by the control valve 194 and which proceeds from line 480 between lands 372 and 374 through line 586 to the right end of the plug 376 varies with the torque load on the engine, i.e., as the engine torque load increases, manifold pressure decreases and the control pressure developed increases. Therefore, the plug 376 increases the biasing resistance of the spring 382 until it engages the stem end 380, at which time, the counter force will be entirely that from the control pressure. The point at which the controlled coupling valve 354 moves to the right will, therefore, vary according to engine speed and engine loads.

After the valve 354 has shifted to the right, pressure fluid from the main supply line 136 and branch line 394 proceeds through the limit valve 384 to line 396 and then between lands 366 and 368 of valve element 358. From this point, pressure fluid departs and proceeds through a feed line 602 and a hub passage 604 to the coupling D.

Pressure fluid for coupling control purposes is simultaneously supplied by a branch line 541 of the main supply line 136 through the controlled coupling valve between lands 360 and 362 to a line 606. Line 606 communicates with the coupling exhaust valves 42 which are shown diagrammatically and which are the subject matter of an application S.N. 477,682 to Cheek, filed December 27, 1954, now Patent No. 2,916,881, entitled "Controlled Fluid Coupling."

Briefly, for purposes of explaining the present invention, the coupling exhaust valves 42 each includes a flanged head portion 608 movable in a slide-way. When the valves 42 are moved downwardly they seat on a shoulder 610 and close a cross exhaust passage 612 which communicates through the valve bore with interior of the coupling. A spring 614 urges with the assistance of centrifugal force the valves upwardly to the demonstrated position and insure a quick exhaust of the coupling as will be apparent. When pressure fluid is supplied by the line 606 to the valves 42, they are moved downwardly against the shoulder 610 closing the cross exhaust passage 612. With these exhaust passages 612 closed and with pressure fluid being supplied by line 602 and passage 604 to the coupling D, it is immediately filled without any substantial leakage.

When the coupling fills, there is a gradual commencement of drive between the pump 34 and the turbine 36 such that the turbine starts to rotate forwardly and carry with it the front unit sun gear 26. The one-way brake elements 54 which prevented reverse rotation of the turbine 36 and the sun gear 26 now allow this forward rotation without interference. Eventually, the speed of rotation of the turbine 36 approximates that of the pump 34, the slight difference being due to the inherent slip, so that the front unit ring gear 22 and sun gear 26 are likewise driven at approximately the same speed. With two members of the gear set B rotating at approximately the same speed, the carrier 18 will also rotate at the same speed since, for all practical purposes, the gear unit is locked up for direct drive. Because the rear unit F continues in reduction drive the overall ratio becomes equal to that of the rear unit and the vehicle is driven in the second speed ratio until the relation between the engine load and the vehicle speed is such that an automatic advance to third speed ratio takes place.

*Shift Second to Third*

After the vehicle attains a certain speed, G–1 pressure which acts on land 414 of the governor plug valve 412 and G–2 pressure which acts on land 402 of the second to third shift valve 400 will be high enough that the two forces resulting therefrom will act jointly to overcome both the resistance of the springs 410 and 428 and control pressure acting on the end of the regulator plug valve 420. The governor plug valve 412 and the second to third shift valve 400 will, under these circumstances, be moved to the right to the upshift position establishing communication between lands 406 and 404 of lines 616 and 618. Line 616 communicates with the manual valve 180 through the line 532 while line 618 is connected to a line 620 extending to the transition valve 342. Pressure fluid in the line 620 proceeds initially to the left end of the transition valve 342 through a reduced passage 622, the purpose of which is to furnish a slow feed to the transition valve. A ball check valve 624 in the companion passage insures a fast exhaust of the end area of the valve, essential for quick downshifts. Upon movement of the transition valve to the right land 346 covers the port connected to line 336 from the G–5 valve, interrupting the supply of G–5 pressure to the control coupling valve 354, and permitting communication between the line 352 and a line 626 which extends to the bore of the third to fourth shift valve 430 between lands 434 and 436. An exhaust passage 628 is opened by these lands 434 and 436 so that pressure fluid is drained from the lines 626, 352 and 583. It should be also noted that the modulated control pressure in line 577 to the right end of the transition valve 342 when cut off by the upshift of the second to third shift valve train 400 is replaced by G–2 pressure in the line 600.

With G–5 pressure removed from the control coupling valve land 360, control pressure in the line 586 with the assistance of spring 382 move the control coupling valve 354 to the position depicted. As a result, the line 606 which extends to the coupling exhaust valves 42 is opened to an exhaust port 630 by lands 360 and 362 and the supply line 602 to the coupling D communicates between lands 366 and 368 with an air vent 632. The coupling D empties rapidly due to the interruption of the supply of pressure fluid to the coupling D, the connection of the supply line 602 to the air vent 632, and the opening of cross passages 612 by exhaust valves 42. Because the ability of the coupling D to transmit torque decreases as the coupling empties, the turbine 36 slows down and eventually stops. Reverse rotation of the turbine is prevented by one-way brake elements 54 and again reduction to the front planetary unit B is established.

Simultaneously with the change of the front planetary unit B, the rear planetary unit F changes from a reduction drive to a direct drive as follows: Line 620 from the second to third shift valve supplies pressure fluid to a branch 634 thereof in communication with the rear unit direct drive clutch J and moves the piston 80 until the clutch pack comprising clutch plates 62 and 78 are locked together in frictional engagement effecting through the coupling A joint rotation of the rear unit ring and sun gears 72 and 66. As explained, since the connection of the gears 72 and 66 through the coupling A, there is a slight difference in the speed of rotation in these gears due to the slippage within the coupling. However, this can be considered negligible for this description.

Timing the engagement of the direct drive clutch J is necessary to prevent a too abrupt engagement. To accomplish this, line 620 is in communication with the accumulator 508 the function of which is to control the pressure of fluid supplied to the clutch J. This accumulator comprises a piston 636 and a spring 638 which biases the piston to the demonstrated position in FIGURE 8. The piston is exposed on the bottom side to pressure fluid in the line 620 and can stroke, i.e., move upwardly the distance permitted by the shoulder 642. The chamber 640 in which the spring 638 is positioned communicates with the accumulator valves 466 and 468 via line 506. As previously described, these valves combine to modulate pressure fluid from the pump supplied by line 300 in accordance with control pressure in the line 480 from the control valve 194. If the control pressure is high, as when the torque load on the engine is high, e.g., with a full throttle shift, the pressure supplied by the valves 466 and 468 to the spring chamber 640 will be a maximum and resist upward movement of the accumulator piston 636. Hence, the pressure of the fluid supplied to the direct drive clutch J will be maintained and the engagement of the clutch will be rapid. On the other hand, if the torque load on the engine is slight, the control pressure will be less and accordingly the modulated pressure in the line 506. Pressure fluid in the line 620 will be capable of moving the piston 636 upwardly and a predetermined volume of fluid moves into the evacuated space in the accumulator 508. A reduction of pressure momentarily results in the line 634 to the clutch J that slows up the engagement of this clutch J to a gradual application. After the accumulator has moved to the limit of its stroke and the clutch is fully engaged, the accumulator may return to the original position forcing the oil out into the line 620.

The transmission now is conditioned for third speed ratio which will be maintained until the vehicle accelerates further.

*Shift Third to Fourth*

As the vehicle speed increases, the point is reached at which G-1 and G-2 pressures developed by the governor and applied respectively to the land 432 of the third to fourth shift valve 430 and land 442 of the governor plug valve 440 will be high enough to overcome jointly the resistance of spring 456 and modulated control pressure acting on the right side of land 432. The third to fourth shift valve train 430 will then be moved to the right whereupon land 436 will close exhaust passage 628 and the line 626 extending to the transition valve 342 will communicate between the lands 434 and 436 with line 616 extending via line 532 to the manual valve 180. Inasmuch as the transition valve 342 had previously been moved to the right, line 626 is opened to line 352 and fluid is supplied at full pump pressure to the left end of the controlled coupling valve 354 overcoming the combined resistances of spring 382 and control pressure acting on plug 376. Coupling valve 354, therefore, moves to the right re-establishing communication between lines 396 and 602 to the coupling exhaust valves 42 and lines 541, 606 and 604 to the interior of coupling D. Coupling D is again filled and causes a transition in the front unit B from reduction drive to direct drive in a manner previously explained in connection with the first to second shift. The rear planetary unit F remains in direct drive so that the overall ratio through the transmission is at a substantially 1:1 ratio or direct drive.

It should be noted that the line 340 and the branch 338 to the G-5 valve 322 also are connected to and receive pressure fluid therefrom which upsets the regulating action of the G-5 valve. Previously, the line 626 had been exhausted either through the transition valve 342 or through the third to fourth shift valve 430. The absence of G-5 pressure in fourth speed ratio, however, is not significant.

When the transmission is operating in the fourth speed ratio, the torque load on the rear unit direct drive clutch J is not as great as in lower speed ratios despite the fact that the vehicle speed may be higher. Since the hydraulic force necessary to maintain the clutch J engaged is less, it is possible to reduce the pressure required. To accomplish this, a line 540 which communicates through the detent valve 226 with the line 538 to the manual valve 180, when the third to fourth shift valve train 430 moves to the upshift position, is opened to a line 644 through lands 444 and 446 of the third to fourth governor plug valve 440. Line 644, which extends to the regulator valve 145, transfers pressure fluid to the top side of the valve land 514, the effect of which is to negative some of the upward bias force of the regulating spring 528. The regulating action of the valve 145 is reduced and, accordingly, the regulated line pressure drops, e.g., from 95 p.s.i. to 65 p.s.i. The load on the pump 56 is reduced and, therefore, the power required to drive the pump is decreased.

After the third to fourth shift valve train 430 is moved to the fourth speed ratio position, a branch line 340 extending to the control valve 194 is supplied with pressure fluid from the line 626. Pressure in line 340 acts between lands 196 and 198 of valve 194 producing a force due to the differential areas that urges the control valve to the right, the decreasing pressure direction. The purpose is to reduce fluctuations in the pressure developed by the control valve 194 during quick changes in manifold pressure brought about by abrupt changes in the position of the throttle. For instance, if the throttle is suddenly closed manifold pressure would rise quickly or if the throttle is opened wide rapidly then manifold pressure would decrease quickly.

Coincident with the supply of pressure fluid to the line 340, pressure fluid flows through a branch 646 thereof to the space between the G-5 valve 322 and the neutral brake valve 276. The existence of fluid in this space is to furnish a cleansing action to insure free movement of these valves.

Normally the vehicle will remain in fourth speed until certain conditions exist. Depending on these existing conditions, a downshift from fourth speed to third speed may be effected in either of one of the three ways described hereafter.

*Part Throttle Fourth to Third Shift*

After the third to fourth shift valve 430 establishes the fourth speed ratio, the port connected to the line 566 which supplies control pressure is closed by land 438. Thus, control pressure is no longer supplied to the right end of the regulator plug valve 448. Assuming that the vehicle is operating below some predetermined maximum speed and that the accelerator pedal 266 is not depressed to the so-called detent or beyond full throttle position, control pressure, which is normally supplied by line 482 to the right end of the land 272 on downshift valve 268, is incapable of overcoming spring 274. But with the existence of certain load and speed conditions, this pressure will be high enough to overcome the spring 274 and move the valve 268 to left whereupon land 272 will close an exhaust port 648 and land 270 will uncover a port connected to a line 650. The line 650 communicates with line 540 which is connected through the lands 228 and 230 of the detent valve 226 to the manual valve connected line 538. Pressure fluid is then supplied through the downshift valve 268 to a line 652 extending to a port connected to the bore in the third to fourth shift valve 430. With the shift valve 430 in the right hand position, pressure fluid in the line 652 can proceed between lands 436 and 438 through line 564 to the end of the regulator plug valve 448. This pressure fluid which has a pressure equivalent to pump pressure will move the plug valve 448 to the left admitting pressure fluid through line 580 into the spring chamber 581 adjacent land 432 on the shift valve. As previously explained, a modulated pressure is developed, which if the vehicle speed is below a predetermined value, is sufficient to move the valve 430 to the downshift position. Pressure fluid supplied by the line 626 through the transition valve 342 to the left end of the control coupling valve 354 is relieved by the opening of the exhaust port 628 between the lands 434 and 436 on shift valve 430 and the controlled coupling valve 354 then moves to the demonstrated position. As before mentioned, the coupling D is emptied whereupon the front unit B provides a reduced drive for third speed. Pressure fluid transferred to the regulator valve 145 through line 644 is cut off by the land 446 of the third to fourth governor plug valve 440 so that pump output pressure is increased to 95 p.s.i. for third speed drive.

This particular shift is advantageous since it is possible for the operator to obtain a downshift during moderate vehicle speeds when considerable acceleration is not desired as with a beyond full throttle or forced downshift.

Detent Fourth to Third Shift

If the transmission is operating in fourth speed ratio at a speed higher than that at which a part throttle downshift can be obtained, e.g., above 35 m.p.h. and below a predetermined maximum vehicle speed, e.g., 25 m.p.h. a forced downshift from fourth speed ratio to third speed ratio can be made by movement of the accelerator pedal 266 to full throttle position and beyond. This act, referring to FIGURE 4, closes switch 264 completing the circuit that energizes the electrical relay 238 whereupon the valve armature 250 is drawn downwardly admitting pressure fluid through the passages 254 and 256 to control chamber 258. Simultaneously, this pressure fluid proceeds through the openings 252 in the valve armature 246 and moves the electrical relay downwardly, as explained before, to increase communication between the reduce passage 254 and the control chamber 258. Pressure fluid in the control chamber 258 will force the detent valve 226 to the left permitting passage of pressure fluid from the manual valve 180 through passages 532 and 540 and between lands 234 and 236 to line 582. Pressure fluid in line 582 can pass around land 450 on the third to fourth regulator plug valve 448 to the line 580 and act on the right end of land 432 of the shift valve 430. This pressure is pump pressure and, therefore, moves the shift valve 430 to the left. If the vehicle speed had been above 75 m.p.h. then the combined opposing forces from G–1 and G–2 pressures could not be overcome by pump pressure. As explained in the preceding part, pressure fluid supplied to line 626 is cut off and the controlled coupling valve 354 returns to the position emptying coupling D.

When the detent valve 226 moved to the left, the line 540 which supplied pressure fluid through the shift valve 430 to line 644 is opened to an exhaust port 654 and the line 538 which supplied pressure fluid to the line 540 is cut off by lands 228 and 230 of the detent valve. This arrangement insures that the pressure fluid which reduced pump output pressure is withdrawn so that pump pressure can increase prior to completion of the downshift. This is imperative since the torque load imposed on the clutch J during such a full throttle shift approximates a maximum to which the clutch is usually subjected; therefore, the hydraulic force maintaining it engaged should be maximum or that which 95 p.s.i. pump output pressure affords.

It should be noted that a line 656 which formerly connected the line 224 from the control valve 194 to exhaust port 654 is now supplied with pressure fluid from line 554. As a result, this pressure fluid acts on the large diameter land 206 of the control valve and halts the valve's regulating action. Control pressure, therefore, becomes equivalent to pump output pressure since the pressure fluid in line 224 will move around land 204 and into the line 218 which supplies control pressure. This insures a maximum control pressure during detent conditions unaffected by intake manifold pressure fluctuations.

The third to fourth regulator plug valve 448 again modulates control pressure as previously discussed in conjunction with third speed ratio operation of the valve.

When the accelerator pedal 266 is released, switch 264 opens the circuit for the electrical relay 238 and the supply of pressure fluid to the control chamber 258 is interrupted by the return of valve armature 250 to a position closing passage 254 and opening chamber 258 to exhaust through core passage 244. Spring 274 then will return both downshift valve 268 and the detent valve 226 to the FIGURE 4 positions. Assuming that control pressure in the line 482 is not sufficient to move the downshift valve 268 to the left, it should be noted that control pressure aids the spring 274 in returning the detent valve 226 to the illustrated position. In this position supply of pressure fluid to the line 582 is interrupted so that the third to fourth shift valve 430 returns to the fourth speed ratio position.

Manual Fourth to Third Shift

When the transmission is operating in fourth speed ratio and below the predetermined maximum at which a downshift to third speed is permitted, movement of the manual valve 180 to the Intermediate or Drive 3 range position will cause a downshift to third speed. In the Intermediate position of the manual valve, the land 186 uncovers line 534 so that pressure fluid is supplied thereto from the pump by lines 136 and 531. Pressure fluid then is furnished by line 584 between the lands 234 and 236 of the detent valve 226 to the line 582 and forces the downshift of the third to fourth shift valve 430 in the manner described above with relation to the detent fourth to third shift. However, a distinction exists since the pump output pressure is restored to normal in a different manner. When the manual valve 180 is moved to the intermediate position, land 184 interrupts communication between the lines 531 and 538 and opens the line 538 to exhaust through the port 598. As a consequence, pressure fluid which was supplied by lines 538 and 540 through the third to fourth shift valve 430 and then by line 644 to the regulator valve 145 is cut off before the shift valve is moved to the third speed ratio position. As explained during discussion of the detent fourth to third downshift, the pressure fluid supplied to the clutch J is increased before a downshift is completed. This safeguards against the possibility that a manual downshift could be made by the operator at a time when the clutch J was subjected to an excessive load.

In third speed ratio the overrun brake E is applied in a manner to be described below concerning intermediate drive 3 range operation.

Intermediate or Drive 3 Range

As discussed during description of the manual fourth to third shift, movement of the manual valve 180 to the Intermediate or Drive 3 Range position at any time causes the land 186 to uncover the port connected to the line 534 to establish communication between the supply line 531 and this line 534. Pressure fluid then proceeds from line 534 to branch 584 extending to the detent valve 226. From the detent valve the pressure fluid proceeds through a line 582 to the third to fourth regulator plug valve 448, and holds the third to fourth shift valve train in the downshift position. If movement of the manual valve to the Intermediate position is made before motion of the vehicle is initiated, the transmission will automatically operate sequentially as explained before for drive in first speed, second speed and then third speed. Unless the vehicle speed exceeds a predetermined maximum, the transmission will not shift to fourth speed ratio since the pressure of the fluid acting on the end area of the regulator plug valve 448 is equivalent to the pump output pressure. The two governor pressures G–1 and G–2 must accordingly be representative of the predetermined high vehicle speed to force an upshift.

The front unit brake valve 458 becomes operative during certain phases of transmission operation in Drive 3 Range. In first and second speed ratios G–5 pressure is transferred through the transition valve 342 via lines 352, 588 to the left end of the brake valve 458 tending to urge the valve to the right against the counter force of the spring 464. Also, in first speed the control coupling valve 354 is in the position depicted by FIGURE 5 so that pressure fluid in the line 534 from the manual valve 180 is transferred between lands 362 and 364 of the coupling valve through the line 590 to act on the right end of brake valve 458. Inasmuch as this pressure is equivalent to pump output pressure, the combination of this pressure and the spring 464 is sufficient to overcome G-5 pressure and maintain communication between the line 590 and the line 592 to the overrun brake E. The piston 48 is actuated by the hydraulic force engaging the clutch plate 46 with the fixed reaction member 52, thus preventing movement of the front unit sun gear 26 in either direction. The effect is to provide engine braking through the transmission in third speed. Otherwise, when the vehicle wheels were driving, as when coasting, the one way brake elements 54 would permit free wheeling to take place during the resultant reversal of torque so that the engine compression could not be utilized as a means of slowing down the vehicle. In second speed ratio, since the controlled coupling valve 354 is moved to the right, the supply of pressure fluid to the line 590 is cut off and exhausted out air vent 632 in the bore of the controlled coupling valve 354. As a result the overrun brake is promptly disengaged. Upon return to third speed ratio the controlled coupling valve 354 re-establishes communication between the line 534 and 590 whereupon the brake E is again engaged to give the desired overrun braking.

The areas of the front unit brake valve 453 are such that an accumulator effect results when the large area at the right end of the valve is filled with fluid. There is a slight reduction in pressure which for an instant slows up engagement of the brake E insuring against an abrupt jarring sensation to the operator.

As before explained, the manual valve 180 can be moved to the Intermediate position at any time and a fourth to third downshift will occur. Also, the manual valve cuts off the line 538 which supplies pressure fluid to the regulator valve 145, thus preventing a pressure drop of pump output pressure in third speed ratio, both of these features having been previously described.

Detent Third to Second Shift

When the transmission is operating in third speed ratio below a predetermined maximum vehicle speed wtih the manual valve 180 in either Drive 4 Range or Drive 3 Range, a shift from third to second can be compelled by movement of the accelerator pedal 266 beyond the full throttle position. This action closes switch 264 and completes the circuit which energizes the electrical relay 238 whereupon pressure fluid can be supplied to the control chamber 258 at the end of the detent valve 226 as explained under the heading of "Detent Fourth to Third Shift" above. When the detent valve 226 moves to the downshift position, pressure fluid is transferred between the lands 232 and 234 to the line 656 and a branch 658 thereof extending to the second to third shift valve train 400. Since the second to third shift valve 400 is in the right hand position, this pressure fluid passes between lands 416 and 418 of the governor plug valve 412 through the line 570 and acts on the end area of the land 424 of the regulator plug valve 420. This pressure being equivalent to that of the pump output will force the entire second to third shift valve train to the left and the downshift position.

In the downshift position of the shift valve 400, the line 634, extending to the clutch J, is opened to exhaust port 660 by lands 404 and 406. The part of the line 620 which extends to the accumulator 508 is similarly exhausted so that the accumulator moves to the position shown in FIGURE 8.

The pressure fluid in the part of the line 620 that extends to the left end of the transition valve 342 is accordingly drained and the transition valve 342 moves to the position illustrated which permits G-5 pressure to be transferred between the lands 346 and 348 via line 352 to the controlled coupling valve 354 forcing it to move to the right so that the coupling D is filled. As mentioned before, when the second to third shift valve 400 moves to the downshift position, modulation of control pressure in the line 570 recommences and this pressure fluid is transferred by the line 577 to the right end of the transition valve 342 moving it quickly to the left. Otherwise, during a third to second downshift movement of the transition valve 342 would be tardy and the filling of the coupling D delayed long enough for the operator to feel first an unpleasant change to first speed ratio followed by an upshift to second speed ratio.

It should be noted that movement of the detent valve 226 to the left establishes pressure fluid supply not only to the second to third shift valve via lines 656 and 658 but also to the third to fourth shift valve via line 582. The final effect of these two pressures depends upon the ratio in which the transmission is operating but if the transmission were operating in fourth speed ratio at a speed below the before mentioned predetermined maximum an enforced fourth to third downshift would follow as explained. Again if the speed is still below the maximum speed at which a third to second downshift can occur then it will take place as just described.

As explained during the description of the detent fourth to third shift, fluid at pump output pressure exists in the line 218 to the control valve 194 and is transferred around land 204 into the control pressure line 218.

Manual Third to Second Shift

By movement of the manual valve 180 to the low range position a shift from the third speed ratio to the second speed ratio can be compelled. With the manual valve in the low range position, land 186 permits communication between line 531 from the pump and line 536 extending to the second to third shift valve 400. Pressure fluid then is transferred by the line 574 around land 408 through line 574 to the right side of land 402 of the second to third shift valve 400 and being the pump output pressure compels a downshift if vehicle speed is below a predetermined maximum. Movement of the shift valve 400 to the left re-establishes second speed operation as described in connection with the detent third to second shift. In addition to the action of the pressure fluid in the line 574, pressure fluid is allowed to act on the land 418 of the governor plug valve 412 through a bypass 662 connected to the line 536. Since the adjacent land 408 of the shift valve 400 has a smaller diameter than the land 418, the pressure fluid urges the governor plug valve 412 to the left. The purpose of this arrangement is to permit a shift from third to second at a higher vehicle speed than the shift could be accomplished by detent action. Therefore, when the transmission has been shifted from third to second by the manual valve 180, it will continue operating in the second speed ratio until a high vehicle speed has been reached, e.g., 45 m.ph.

Low Range Operation

The manual valve 180 can be moved to the Low Range position at any time either when the transmission is in operation or in neutral. As just described, the line 536 then communicates with lines 136 and 531 from the pump. Pressure fluid transferred by the lines 536 and 574 act on the land 402 of the shift valve 400 to prevent advance beyond second speed ratio during normal operating conditions. If the transmission is operating in fourth speed ratio when the manual valve is moved to the low position, it will continue operating in fourth speed until the vehicle speed drops to the speed that permits second speed operation. Then the transmission will be compelled to shift to second speed. If the vehicle is exceeding a predetermined speed in second speed ratio combined action of governor pressures G-1 and G-2 will force the shift valve 400 to the right and an upshift will occur, hence the front and rear units B and F will be conditioned for third speed ratio as during a normal second to third shift.

Whenever the manual valve is moved to the Low Range position and the vehicle is operating in second speed, communication between the line 536 and a line 664 extending to a servo 665 is permitted between lands 406 and 408 of the shift valve 400. Pressure fluid in the line 664 will move the servo piston 666 upwardly, as viewed in FIGURE 8, against the opposing bias of a band release spring 668 and engage the band 76 for the overrun brake H. With the brake H in operation, the brake drum 74 is prevented from rotation due to the fact that the band is grounded to the casing and the frictional engagement between the drum and the band 76. Consequently, the ring gear 72 is prevented from rotation in either direction. This prevents previous overrun in the rear unit F due to the reversal of torque occurring when the vehicle is coasting. Therefore, the engine can be employed to retard the vehicle. Otherwise, the one way brake elements 96 would permit free wheeling through the rear unit F and braking, which would be essential, e.g., descending a long incline, would not be available.

*Reverse*

With the vehicle at rest or having forward motion not exceeding, for instance, 8 m.p.h., the manual valve 180 can be moved to the reverse position without interference from the reverse blocker 546. In this position, lines 192, 532, 534 and 536 are open to an exhaust port 669 in the manual valve bore permitting drainage of the units employed for forward drive. Pump output pressure fluid then is transferred by lines 136 and 531 through the bore of the manual valve between lands 182 and 184 to a branch line 596 extending to the reverse supply line 594. Inasmuch as line 532 is exhaustd the connected lines 556 and 558 to the neutral brake G are relieved whereupon the neutral brake G will disengage. A portion of the line 594 extends to the bottom end of the bore for the regulator valve 145 and acts on the end of the plug 530 to force it upwardly and in turn move the regulator valve 145 upwardly to the extent permissible. When this occurs, pressure fluid in the lines 138 and 140 is transferred through the central bore 524 in the regulator valve 145, through the cross orifice 526, between the lands 518 and 520 and out line 144 to the bottom of the slide 130 forcing the slide upwardly to the maximum output pressure position. This assures a higher pump output pressure than is used in forward drive. In fact, substantially double the forward drive pressure to approximately 195 p.s.i. The reason for increasing pump output pressure in reverse is because the reaction forces on the reverse brake L are very large, therefore, a greater hydraulic force is required.

A branch 670 of the line 594 is connected to the controlled coupling valve 354 and acts on the right end of the valve land 374 preventing any possible upshift of the coupling valve 354 that could start filling of the coupling D. Consequently, the front unit is in reduction drive with one way brake elements 56 preventing reverse rotation of the front unit sun gear 26.

The front unit brake valve 458 will remain in the position illustrated in FIGURE 5 until G-5 pressure from the G-5 valve 322 supplied through lines 336, between lands 346 and 348 of transition valve 342, and out lines 352 and 588 to the left end of the brake valve is sufficient to move the valve to the right, e.g., at 6 to 7 m.p.h. in reverse. Pressure fluid in the line 590 which communicates with the right end of the brake valve 458 is exhausted through the bore of the manual valve and, therefore, the only force opposing G-5 pressure is that from the spring 464. After the valve 458 is shifted to the right, pressure fluid is transferred from a branch line 672 of line 594 to the overrun brake E by line 592. A restriction 674 in the line 672 insures against an abrupt engagement of the brake E by temporarily slowing up the pressure fluid supply to the piston 48. With the brake E engaged, front unit sun gear 26 is prevented from rotation in either direction, hence affording overrun braking in reverse.

To insure a drop in pump pressure, a branch 676 of the line 594 transfers pressure fluid to the right side of land 442 of the third to fourth governor plug valve 440 and prevents the valve 440 from moving to the right and establishing communication between lands 444 and 446 of lines 540 and 644.

Pressure fluid in the line 594 is simultaneously supplied during the foregoing to the reverse brake L and acts on the piston 122 to engage the brake L and restrain the reverse ring gear 108 against rotation. Drive then is from the front unit B at a reduced rate to the sun gear 66 of the rear unit F and, as explained before, the output shaft 102 and the attached rear unit carrier 70 afford temporary reaction that induces the rear unit ring gear 72 to rotate in a reverse direction, this being permitted by release of both the band H and the neutral brake G. Reverse rotation of the ring gear 72 is transferred to the reverse sun gear 110 and then to the reverse carrier 104 and the output shaft 102. The transmission will continue operating in reverse irregardless of the speed attained by the vehicle.

*Closed Throttle Downshift*

When the vehicle is being brought to rest downshifts will occur in reverse order but at points different from those at which upshifts occur. In other words, if an upshift occurred at 15 m.p.h., a normal downshift will occur at a lesser speed. One reason is that the control pressure is reduced when the throttle is closed. Another reason is that there is a difference in size in the lands of the shift valves which determine the shift points. For instance, it will be noted that land 434 of the third to fourth shift valve 430 has a larger diameter than the adjacent land 436. As a result of this difference, when fluid pressure in the line 616 passes between these lands into the line 626, a greater hydraulic force is exerted on the larger land 434 because of the greater exposed surface. This causes a tendency to hold the third to fourth shift valve in the upshift position. Governor pressure acting on this valve train must, therefore, drop to a lower value than would be necessary to move the valve train to the right under a similar or equivalent control pressure.

Also, in the second to third shift valve train 400, the land 404 has a larger diameter than the land 406 so that pressure fluid being transferred between the lines 616 and 618 exerts a greater force to the right in opposing a downshift, hence the closed throttle downshift occurs at a lower vehicle speed than that at which the upshift occurs with the same control pressure.

These differential areas create what is known in the art as hysteresis effects and vary the points at which downshifts and upshifts occur under similar conditions.

*Exhaust of the System*

After the vehicle is brought to rest, the engine stopped, and the manual valve positioned in either the Neutral or Park positions, the system is exhausted as follows: the main coupling A may retain oil for an extended period, being exhausted solely by leakage therefrom. The coupling D exhausts into the casing C through the coupling exhaust valves 42 which, after centrifugal force and fluid pressure are removed, are urged by the spring 614 upwardly to open cross passages 612. With the coupling D stopped, oil will drain out the lowermost valve 42 through this exhaust passage 612. The overrun brake E will drain through lines 592, 590 and 534 and then out the bore of the manual valve 180. Neutral brake G drains out the bore of the manual valve 180 through lines 560 and 536. The direct drive clutch J is exhausted through the connection of lines 634 and 618 to the exhaust port 616 in the bore of the second to third shift valve 440. Reverse brake L is relieved of pressure fluid by the communication of lines 594 and 596 with exhaust port 598 in the bore of the manual valve 180. In this manner, all of the friction engaging devices which establish torque trains through the transmission are all released interrupting drive through the transmission in either direction.

Several of the lands on the various valves utilized in the control system have been furnished with annular cleaning grooves. To explain the function of these grooves, reference is made to the controlled coupling valve 354 in FIGURE 5 since it is representative. During reciprocating movements of the coupling valve 354, the cleaning groove in the land 362 on the valve element 356 will pick up dirt and other foreign material.

When the valve element 356 is moved to the position depicted, this dirt will be washed away by pressure fluid in the port connected to line 541. Therefore, free operation of the valve is assured.

I claim:

1. In a transmission for an engine having an intake manifold, gearing, a shift valve train movable from a downshift position causing the gearing to be conditioned for a low speed ratio to an upshift position causing the gearing to be conditioned for a higher speed ratio, a source of fluid pressure, a control valve for regulating pressure from the source, means causing the control valve to regulate pressure in accordance with variations in pressure in the intake manifold, and other means causing the control valve to also regulate pressure in accordance with variations in atmospheric pressure, said means and said other means being so arranged as to develop opposing forces for acting on the control valve whenever intake manifold pressure and atmospheric pressure are both increasing or both decreasing, the regulated pressure from the control valve opposing movement of the shift valve train to the upshift position.

2. In a transmission for an engine having an intake manifold, gearing, a shift valve train movable from a downshift position causing the gearing to be conditioned for a low speed ratio to an upshift position causing the gearing to be conditioned for a higher speed ratio, a source of fluid pressure, a control valve for regulating the fluid pressure from the source and for supplying the regulated pressure to the shift valve train, the regulated pressure opposing movement of the shift valve train to the upshift position, intake manifold pressure operated means and atmospheric pressure operated means, both coacting to establish the pressure at which the control valve is to regulate so that the pressure is reflective of both intake manifold pressure and atmospheric pressure.

3. In a transmission for an engine having an intake manifold, gearing, a shift valve train movable from a downshift position causing the gearing to be conditioned for a low speed ratio to an upshift position causing the gearing to be conditioned for a higher speed ratio, a source of fluid pressure, a control valve for regulating fluid pressure from the source and for supplying the regulated pressure to the shift valve, the regulated pressure opposing movement of the shift valve train to the upshift position, intake manifold pressure operated means for causing the control valve to decrease the regulated pressure with an increase of pressure in the intake manifold, and atmospheric pressure operated means for causing the control valve to increase the regulated pressure with an increase in atmospheric pressure.

4. In a transmission for an engine having an intake manifold, gearing, a shift valve train movable from a downshift position causing the gearing to be conditioned for a low speed ratio to an upshift position causing the gearing to be conditioned for a higher speed ratio, a source of fluid pressure, a control valve for regulating fluid pressure from the source and for supplying the regulated pressure to the shift valve, the regulated pressure opposing movement of the shift valve train to the upshift position, a chamber including a movable member operatively associated with the control valve, the movable member being exposed to intake manifold pressure, an expansible chamber motor having the exterior thereof exposed to atmospheric pressure and operatively associated with the control valve, the movable member and the motor coacting to vary the pressure regulated by the control valve with changes in atmospheric pressure and intake manifold pressure.

5. In a transmission for an engine having an intake manifold, gearing, a shift valve train movable from a downshift position causing the gearing to be conditioned for low speed ratio to an upshift position causing the gearing to be conditioned for a higher speed ratio, a source of fluid pressure, a control valve for regulating fluid pressure from the source in accordance with variations in pressure in the intake manifold and atmospheric pressure, the regulated pressure from the control valve opposing movement of the shift valve train to the upshift position, and means connecting the fluid pressure from the source to a partial area of the control valve in response to movement of the shift valve train to the upshift position to stabilize movements of said control valve.

6. In a transmission for a throttle controlled engine, gearing, a shift valve train movable from a downshift position causing the gearing to be conditioned for a low speed ratio to an upshift position causing the gearing to be conditioned for a higher speed ratio, a source of pressure fluid, control means including an electrical relay energized by movement of the throttle beyond full throttle position, a detent valve operated by the electrical relay, a fluid connection between the shift valve train and the detent valve controlled by the detent valve, the electrical relay including a valve armature movable to an open position by the energization of the electrical relay, the valve armature being operative in the open position to supply pressure fluid from the source for moving the detent valve to permit pressure fluid to be supplied from the source through the connection to move the shift valve train to the downshift position, the electrical relay being movable by the pressure fluid when the valve armature is in the open position so as to increase flow to the detent valve.

7. In a transmission for a throttle controlled engine, gearing, a shift valve train movable from a downshift position causing the gearing to be conditioned for a low speed ratio to an upshift position causing the gearing to be conditioned for a higher speed ratio, a source of pressure fluid, a detent valve connected to the source, a connection between the shift valve train and the detent valve, control means including an electrical relay energized by movement of the throttle beyond full throttle position, the electrical relay including a movably supported housing, an electrical winding supported by the housing, a valve armature movable to an open position due to the energization of the electrical winding and so arranged as to direct fluid pressure from the source to an area of the detent valve for actuating the detent valve to supply pressure fluid from the source for moving the shift valve train to the downshift position, the movably supported housing being movable with the valve armature by the fluid pressure so as to increase pressure fluid flow to the area of the detent valve when the electrical winding is energized.

8. In a transmission for a throttle controlled engine having an intake manifold, gearing, hydraulically operated mechanisms for so conditioning the gearing as to establish a plurality of forward speed ratios and a reverse speed ratio, a shift valve train movable from a downshift position causing the mechanisms to condition the gearing for a low speed ratio to an upshift position causing the mechanisms to condition the gearing for a higher speed ratio, a source of fluid pressure, governor mechanism for metering fluid from the source in accordance with the speed of the transmission, fluid pressure from the governor being supplied to the valve train to bias it in one direction, a control valve for regulating fluid pressure from the source, means causing the control valve to regulate pressure in accordance with variations in pressure in the intake manifold, other means causing the control valve to regulate pressure in accordance with variations in atmospheric pressure, said means and said other means being so arranged as to develop opposing forces for acting on the control valve whenever intake manifold pressure and atmospheric pressure are both increasing or both decreasing, regulated fluid pressure from the control valve biasing the valve train in a direction opposite to that from the bias by fluid pressure from the governor, the valve train when moved to the upshift position interrupting supply of fluid pressure from the control valve to the valve train so that the influence of the regulated fluid pressure from the control valve is removed from the valve train, control means including an electrical relay operated by movement of the throttle beyond a full throttle position, a detent valve movable by the electrical relay, and a connection between the shift valve train and the detent valve opened by the detent valve, when the electrical relay is operated, for supplying fluid pressure from the source to the shift valve train to move it to the downshift position with the opposing fluid pressure from the governor to the valve train below a predetermined maximum.

9. In a transmission for a throttle controlled engine having an intake manifold, gearing, hydraulically operated mechanisms for so conditioning the gearing as to establish a plurality of forward speed ratios and a reverse speed ratio, a shift valve train movable from a downshift position causing the mechanism to condition the gearing for a low speed ratio to an upshift position causing the mechanisms to condition the gearing for a higher speed ratio, a source of fluid pressure, governor mechanism for metering fluid from the source in accordance with the speed of the transmission, fluid pressure from the governor being supplied to the valve train to bias the valve train in one direction, a control valve for regulating fluid pressure from the source, means causing the control valve to regulate pressure in accordance with variations in pressure in the intake manifold, other means causing the control to regulate pressure in accordance with variations in atmospheric pressure, regulated fluid pressure from the control valve biasing the valve train in a direction opposite to that from the bias by fluid pressure from the governor, the valve train when moved to the upshift position interrupting supply of fluid from the control valve to the valve train so that the influence of the regulated fluid pressure from the control valve is removed from the valve train, an electrical relay operated by movement of the throttle beyond a full throttle position, a detent valve movable by the electrical relay, a connection between the shift valve train and the detent valve opened by the detent valve, when the electrical relay is operated, for supplying fluid pressure from the source to the shift valve train to move it to the downshift position with the opposing fluid pressure from the governor to the valve train below a predetermined maximum, and another connection between the detent valve and the control valve opened by the detent valve, when moved by the electrical relay, for supplying pressure fluid to the control valve to increase the regulated fluid pressure from the control valve to a predetermined maximum.

10. In a transmission for a throttle controlled engine having an intake manifold, gearing, hydraulically operated mechanisms for so conditioning the gearing as to establish a plurality of forward speed ratios and a reverse speed ratio, a shift valve train movable from a downshift position causing the mechanisms to condition the gearing for a low speed ratio to an upshift position causing the mechanism to condition the gearing for a higher speed ratio, a source of fluid pressure, governor mechanism for metering fluid from the source in accordance with the speed of the transmission, fluid pressure from the governor being supplied to the valve train to bias the valve train in one direction, a control valve for regulating fluid presssure from the source, means causing the control valve to regulate pressure in accordance with variations in pressure in the intake manifold, other means causing the control valve to regulate pressure in accordance with variations in atmospheric pressure, regulated fluid pressure from the control valve biasing the valve train in a direction opposite to that from the bias by fluid pressure from the governor, the valve train when moved to the upshift position interrupting supply of fluid from the control valve to the valve train so that the influence of the regulated fluid pressure from the control valve is removed from the valve train, an electrical relay operated by movement of the throttle beyond full throttle position, a detent valve movable by the electrical relay, and a connection between the shift valve train and the detent valve opened by the detent valve, when the electrical relay is operated, for supplying pressure fluid from the source to the shift valve train to move it to the downshift position with the opposing fluid pressure from the governor to the valve train below a predetermined maximum, and another valve movable by control pressure for supplying fluid pressure to the shift valve train to move it to the downshift position with the opposing fluid pressure from the governor to the shift valve train below a second predetermined maximum.

11. In a transmission for a throttle controlled engine having intake manifold, gearing, hydraulically operated mechanisms for so conditioning the gearing as to establish a plurality of forward speed ratios and a reverse speed ratio, a shift valve train movable from a downshift position causing the mechanisms to condition the gearing for low speed ratio to an upshift position causing the mechanism to condition the gearing for a higher speed ratio, a source of fluid pressure, governor mechanism for metering fluid from the source in accordance with the speed of the transmission, fluid pressure from the governor being supplied to the valve train to bias the valve train in one direction, a control valve for regulating fluid pressure delivered by the source to the shift valve train for biasing the valve train in a direction opposite to that from bias by fluid pressure from the governor, intake manifold pressure operated means causing the control valve to decrease the regulated fluid pressure with an increase of pressure in the intake manifold, atmospheric pressure operated means causing the control valve to increase the regulated pressure with an increase in atmospheric pressure, the shift valve train when moved to the upshift position interrupting supply of fluid from the control valve to the valve train so that the influence of the regulated fluid pressure from the control valve is removed from the valve train, an electrical relay energized by movement of the throttle beyond a full throttle position, a detent valve movable by the electrical relay, a connection between the shift valve train and the detent valve, the electrical relay including a valve armature operable, when the electrical relay is energized, to supply fluid pressure from the source to the detent valve to move the detent valve so as to open the connection and permit fluid pressure to be supplied to the shift valve train to move it to the downshift position with the pressure from the governor to the valve train below a predetermined maximum.

12. In a transmission for a throttle controlled engine having an intake manifold, gearing, hydraulically operated mechanisms for so conditioning the gearing as to establish a plurality of forward speed ratios and a reverse speed ratio, a shift valve train movable from a downshift position causing the mechanisms to condition the gearing for a low speed ratio to an upshift position causing the mechanism to condition the gearing for a higher speed ratio, a source of fluid pressure, governor mechanism for metering fluid from the source in accordance with the speed of the transmission, fluid pressure from the governor being supplied to the valve train to bias the valve train in one direction, a control valve for regulating fluid pressure from the source and supplying a regulated pressure to the valve train biasing the valve train in a direction opposite to that from the bias by fluid pressure from the governor, a chamber including a movable member operatively associated with the control valve, a movable member being exposed to pressure in the intake manifold, a closed contractible and expansible chamber having the exterior thereof exposed to atmospheric pressure and operably associated with the control valve, the chambers coacting to vary the regulated fluid pressure developed by the control valve with changes in atmospheric pressure and intake manifold pressure, an electrical relay energized by movement of the throttle beyond a full throttle position, a detent valve movable by the electrical relay, a fluid connection between the shift valve train and the source through the detent valve, the electrical relay including a movably supported housing, an electrical winding associated with the housing, and a valve armature movable when the electrical winding is energized to direct fluid pressure from the source to the detent valve for moving the detent valve so as to open the connection through the detent valve to supply fluid pressure to the shift valve train to move the valve train to the downshift position when the fluid pressure from the governor acting on the valve train is below a predetermined maximum.

13. In a transmission for a throttle controlled engine having an intake manifold, gearing, hydraulically operated mechanisms for so conditioning the gearing as to establish a plurality of forward speed ratios and a reverse speed ratio, a shift valve train movable from a downshift position causing the mechanisms to condition the gearing for a low speed ratio to an upshift position causing the mechanism to condition the gearing for a higher speed ratio, a source of fluid pressure, governor mechanism for metering fluid from the source in accordance with the speed of the transmission, fluid pressure from the governor being supplied to the valve train to bias the valve train in one direction, a control valve for regulating fluid pressure from the source and supplying a regulated pressure to the valve train biasing the valve train in a direction opposite to that from the bias by fluid pressure from the governor, a chamber including a movable member operatively associated with the control valve, the movable member being exposed to pressure in the intake manifold, a closed contractible and expansible chamber having the exterior thereof exposed to atmospheric pressure and operably associated with the control valve, the chambers coacting to vary the regulated pressure developed by the control valve with changes in atmospheric pressure and intake manifold pressure, an electrical relay energized by movement of the throttle beyond a full throttle position, a detent valve movable by the electrical relay, a fluid connection between the shift valve train and the source through the detent valve, the electrical relay including a movably supported housing, an electrical winding associated with the housing, a valve armature movable when the electrical winding is energized to direct fluid pressure from the source to the detent valve for moving the detent valve so as to open the connection through the detent valve to supply fluid pressure to the shift valve train to move the valve train to the downshift position when the pressure from the governor acting on the valve train is below a predetermined maximum, the movably supported housing being movable with the valve armature to increase fluid pressure flow for moving the detent valve when the electrical relay is energized, and a connection between the detent valve and the control valve opened by the detent valve when moved by opration of the electrical relay for supplying fluid pressure to the control valve to increase the regulated fluid pressure from the control valve to a predetermined maximum.

14. In a transmission for a throttle controlled engine having an intake manifold, gearing, hydraulically operated mechanisms for so conditioning the gearing as to establish a plurality of forward speed ratios and a reverse speed ratio, a shift valve train movable from a downshift position causing the mechanisms to condition the gearing for a low speed ratio to an upshift position causing the mechanism to condition the gearing for a higher speed ratio, a source of fluid pressure, governor mechanism for metering fluid from the source in accordance with the speed of the transmission, fluid pressure from the governor being supplied to the valve train to bias the valve train in one direction, a control valve for regulating fluid pressure from the source and supplying a regulated pressure to the valve train biasing the valve train in a direction opposite to that from the bias by fluid pressure from the governor, a chamber including a movable member operatively associated with the control valve, the movable member being exposed to pressure in the intake manifold, a closed contractible and expansible chamber having exterior thereof exposed to atmospheric pressure and operably associated with the control valve, the chambers coacting to vary the regulated pressure developed by the control valve with changes in atmospheric pressure and intake manifold pressure, the valve train when moved to the upshift position interrupting supply of fluid from the control valve to the valve train, an electrical relay energized by movement of the throttle beyond a full throttle position, a detent valve movable by the electrical relay, a fluid connection between the shift valve train the source through the detent valve, the electrical relay including a movably supported housing, an electrical winding associated with the housing, a wave armature movable when the electrical winding is energized to direct fluid pressure from the source to the detent valve for moving the detent valve so as to open the connection through the detent valve to supply fluid pressure to the shift valve train to move the valve train to the downshift position when the pressure from the governor acting on the valve train is below a predetermined maximum, the movably supported housing being movable with the valve armature to increase fluid pressure flow for moving the detent valve when the electrical relay is energized, and another valve movable by the regulated fluid pressure from the control valve for supplying fluid pressure to the shift valve train to move it to the downshift position when the pressure from the governor acting on the shift valve train is below a second predetermined maximum.

15. In a transmission for an engine having a vacuum source, ratio changing mechanism for conditioning the transmission as to afford up and downshifts between high and low speed drives, a source of fluid pressure, and a control valve for regulating pressure from the source, means causing the control valve to regulate pressure in accordance with variations in the pressure from the vacuum pressure source, and other means causing the control valve to also regulate pressure with variations in atmospheric pressure, the regulated pressure from the control valve acting on the ratio changing mechanism so as to vary the points at which shifts are made thereby.

16. In a transmission for a throttle controlled engine, ratio changing mechanism for so conditioning the transmission as to afford up and downshifts between high and low speed drives, a source of pressure fluid, a detent valve train for receiving pressure fluid from the source, an electrical relay rendered operative upon movement of the throttle beyond full throttle position, and a fluid connection between the ratio changing mechanism and the detent valve train, the electrical relay, when operative, causing pressure fluid to be furnished from the source for moving the detent valve train so as to allow pressure fluid from the source to be supplied through the connection for moving the shift valve train to the downshift position, the electrical relay being so constructed as to be acted upon by the pressure fluid and thereby increase the flow thereof to the detent valve.

17. In a transmission for an engine having a vacuum source, ratio changing mechanism for so conditioning the transmission as to afford up and down shifts between high and low speed drives, a source of fluid pressure, a control valve for regulating pressure from the source, means causing the control valve to regulate pressure in accordance with variations in the pressure from the vacuum source relative to atmospheric pressure, and other means causing the control valve to also regulate pressure with variations in atmospheric pressure, the regulated pressure from the control valve acting on the ratio changing mechanism so as to vary the points at which shifts are made thereby.

18. In a transmission for a throttle controlled engine having an intake manifold, ratio changing mechanism for so conditioning the transmission as to provide a plurality of forward speed ratios, a shift valve train movable from a downshift position causing the mechanism to condition the transmissions for a low speed ratio to an upshift position causing the mechanism to condition the transmission for a higher speed ratio, a source of fluid pressure, a governor for developing a fluid pressure corresponding to the speed of the transmission, fluid pressure from the governor being supplied to the valve train so as to bias it in one direction, a control valve for regulating fluid pressure from the source, means causing the control valve to regulate pressure in accordance with variations in pressure in the intake manifold relative to atmospheric pressure, other means causing the control valve to regulate pressure in accordance with variations in atmospheric pressure, the regulated fluid pressure from the control valve biasing the valve train in a direction opposite to that from the bias by the fluid pressure from the governor, the valve train when moved to the upshift position interrupting supply of fluid pressure from the control valve to the valve train, control means including an electrical relay operated by movement of the throttle beyond a full throttle position, a detent valve movable by the electrical relay and a connection between the shift valve train and detent valve opened by the detent valve when the electrical relay is operated for supplying fluid pressure from the source to shift valve train to move it to the downshift position with the opposing fluid pressure from the governor to the valve train below a predetermined maximum, the electrical relay when operative causing pressure fluid to be furnished from the source for moving the detent valve so as to open the connection, the electrical relay when operative being also arranged so as to be acted upon by the fluid pressure for moving the detent valve and thereby increase the flow thereof to the detent valve.

19. In a transmission for a throttle controlled engine, gearing, a shift valve train movable from a downshift position causing the gearing to be conditioned for a low speed ratio to an upshift position causing the gearing to be conditioned for a higher speed ratio, a source of pressure fluid, a detent valve train for receiving pressure fluid from the source, an electrical relay rendered operative upon movement of the throttle beyond full throttle position, and a fluid connection between the shift valve train and the detent valve train, the electrical relay, when operative, causing pressure fluid to be furnished from the source for moving the detent valve train so as to allow pressure fluid from the source to be supplied through the connection for moving the shift valve train to the downshift position, the electrical relay being so constructed as to be acted upon by the pressure fluid and thereby increase the flow thereof to the detent valve.

References Cited in the file of this patent

UNITED STATES PATENTS

| | | |
|---|---|---|
| 2,372,853 | Ray | Apr. 3, 1945 |
| 2,391,017 | Grantkowski | Dec. 18, 1945 |
| 2,400,126 | Matthews | May 14, 1946 |
| 2,434,420 | Lichtenstein et al. | Jan. 13, 1948 |
| 2,482,460 | Browne | Sept. 20, 1949 |
| 2,584,965 | McFarland | Feb. 5, 1952 |
| 2,595,969 | McFarland | May 6, 1952 |
| 2,614,583 | Di Maggio | Oct. 21, 1952 |
| 2,645,135 | Frank | July 14, 1953 |
| 2,693,711 | Kelbel | Nov. 9, 1954 |
| 2,693,921 | McKissack et al. | Nov. 9, 1954 |
| 2,706,885 | Ostroff | Apr. 25, 1955 |
| 2,711,656 | Smirl | June 28, 1955 |
| 2,722,296 | Stoeckicht | Nov. 1, 1955 |
| 2,740,604 | Swigart et al. | Apr. 3, 1956 |
| 2,766,639 | Rosenberger | Oct. 16, 1956 |
| 2,788,678 | Sheppard | Apr. 16, 1957 |
| 2,791,913 | Slack | May 14, 1957 |
| 2,794,349 | Smirl | June 4, 1957 |
| 2,865,227 | Kelley et al. | Dec. 23, 1958 |